(12) United States Patent
Yan

(10) Patent No.: US 11,393,153 B2
(45) Date of Patent: Jul. 19, 2022

(54) SYSTEMS AND METHODS PERFORMING OBJECT OCCLUSION IN AUGMENTED REALITY-BASED ASSEMBLY INSTRUCTIONS

(71) Applicant: The Texas A&M University System, College Station, TX (US)

(72) Inventor: Wei Yan, College Station, TX (US)

(73) Assignee: The Texas A&M University System, College Station, TX (US)

(*) Notice: Subject to any disclaimer, the term of this patent is extended or adjusted under 35 U.S.C. 154(b) by 0 days.

(21) Appl. No.: 16/887,485

(22) Filed: May 29, 2020

(65) Prior Publication Data
US 2021/0375025 A1 Dec. 2, 2021

(51) Int. Cl.
*G06T 15/00* (2011.01)
*G06T 15/80* (2011.01)
*G06K 9/00* (2022.01)
*G06T 19/00* (2011.01)
*G06T 7/00* (2017.01)
(Continued)

(52) U.S. Cl.
CPC .......... *G06T 15/005* (2013.01); *A63H 33/06* (2013.01); *G06T 7/0002* (2013.01); *G06T 15/80* (2013.01); *G06T 19/006* (2013.01); *G06V 20/20* (2022.01)

(58) Field of Classification Search
CPC ..... G06T 15/405; G06T 15/40; G06T 15/005; G06T 15/503; G06T 15/10; G06T 19/00; G06T 17/00; G06T 7/00; G06T 19/006; G06T 2215/16; G06F 2111/18; G06F 3/0481; G06F 3/04817; G06F 9/4443; G06F 3/04847; G06F 11/3664; G06F 3/012; G06F 3/0304; G06F 3/011–015;
(Continued)

(56) References Cited

U.S. PATENT DOCUMENTS 11,037,573 B2 * 6/2021 Arantes .................. G06N 20/00
2007/0063997 A1 * 3/2007 Scherer ............... G06F 3/04845
345/419
(Continued)

OTHER PUBLICATIONS

Jirout, J. J., & Newcombe, N. S. (2015). Building blocks for developing spatial skills: Evidence from a large, representative US sample. Psychological science, 26(3), 302-310.
(Continued)

*Primary Examiner* — Todd Buttram
(74) *Attorney, Agent, or Firm* — Meunier Carlin & Curfman LLC

(57) ABSTRACT

A method for performing object occlusion is disclosed. The method includes capturing an image of a physical item, determining a location and an orientation of a first virtual item with an augmented reality registration function; generating an augmented reality image, wherein the augmented reality image comprises a rendering of the first virtual item in the image using a first rendering function to depict the location and orientation of the first virtual item in the image and a rendering of a second virtual item in the image with a second rendering function; displaying the augmented reality image, wherein occlusion of the first virtual item by the physical item is shown in the augmented reality image based on occlusion of the first virtual item by the second virtual item wherein the first virtual item depicts a next step in the step-by-step instructions for the assembly.

15 Claims, 18 Drawing Sheets

(51) Int. Cl.
*A63H 33/06* (2006.01)
*G06V 20/20* (2022.01)

(58) Field of Classification Search
CPC ... G06K 9/00664–00704; H04N 5/272; H04N 2201/3245; A63F 13/10
See application file for complete search history.

(56) References Cited

U.S. PATENT DOCUMENTS

| | | | |
|---|---|---|---|
| 2012/0105473 A1* | 5/2012 | Bar-Zeev | G06T 7/70 345/633 |
| 2014/0378023 A1* | 12/2014 | Muthyala | G06T 19/00 446/91 |
| 2017/0173486 A1* | 6/2017 | Rothschild | A63H 33/086 |
| 2018/0085682 A1* | 3/2018 | Anderson | A63H 33/26 |
| 2018/0095542 A1* | 4/2018 | Mallinson | G06F 1/163 |
| 2018/0129276 A1* | 5/2018 | Nguyen | G09B 9/00 |
| 2019/0105579 A1* | 4/2019 | Karunaralne | A63H 33/08 |
| 2019/0240581 A1* | 8/2019 | Walker | A63F 13/65 |
| 2020/0125872 A1* | 4/2020 | Jensen | B64D 43/00 |
| 2020/0142388 A1* | 5/2020 | Maggiore | H04W 4/33 |
| 2020/0341538 A1* | 10/2020 | Zhu | A63F 9/1208 |
| 2021/0074052 A1* | 3/2021 | Ha | G06T 15/005 |

OTHER PUBLICATIONS

Martin, C. V. (Oct. 2007). Toward More Usable Pictorial Assembly Instructions for Children. In Proceedings of the Human Factors and Ergonomics Society Annual Meeting, vol. 51, No. 17, pp. 1025-1028. Sage CA: Los Angeles, CA: SAGE Publications.

Tracy, D. M. (1987). Toys, spatial ability, and science and mathematics achievement: Are they related? Sex Roles, 17(3-4), 115-138.

Eisenberg, M. and Eisenberg, A. (1998). Middle tech: blurring the division between high and low tech in education. In The design of children's technology, 20 pages.

10 Important Skills Children Learn from LEGOs—Preschool Inspirations https://preschoolinspirations.com/10-important-skillschildren-learn-legos/ Published Jul. 8, 2016.

Lego-based therapy for children with autism endorsed by Cambridge University's Autism Research Centre https://www.cambridgeindependent.co.uk/news/lego-basedtherapy-for-children-with-autism-endorsed-by-cambridgeuniversity-s-autism-research-centre-9053204/ Published Dec. 2, 2017.

Christensen, A. L., & Biskjaer, M. M. (Sep. 2018). Designing Digital Interactive Instructions for Children's Construction Play. In Proceedings of the 36th European Conference on Cognitive Ergonomics (p. 5). ACM.

Agrawala, M., Phan, D., Heiser, L, Haymaker, J., KHngner, L, Hanrahan, P., & Tversky, B. (Jul. 2003). Designing effective stepby-step assembly instructions. In ACM Transactions on Graphics (TOG) (vol. 22, No. 3, pp. 828-837). ACM.

Heiser, et al., IdentiYication and validation of cognitive design principles for automated generation of assembly instructions. In Proceedings of the working conference on Advanced Visual Interfaces (pp. 311-319). 2004. ACM.

Smith, P. K., & Pellegrini, A. (2008). Learning through play. Encyclopedia on early childhood development, 24(8), 61.

Wood, H., & Ashton, P. (Jan. 2010). The factors of project complexity. CIB.

Lindstrom, M. (2016). Small data: the tiny clues that uncover huge trends. St. Martin's Press, Introduction, 15 pages.

9 Ways Lego has changed since we were kids https://wwwtodaysparent.com/blogs/9-ways-lego-haschanged-since-we-were-kids/ Published Nov. 25, 2004.

Google Lens gets integrated into the camera app https://www.cnet.com/news/google-lens-gets-its-own-cameraapp/ Published May 8, 2018.

Chen, Z., Liao, C. and Chu, C. An Assembly Guidance System of Tou Kung Based on Augmented Reality, in Proceedings of the 23$^{rd}$ CAADRIA Conference—vol. 1, Tsinghua University, Beijing, China, May 17-19, 2018, pp. 349-358.

Alonso, L., Zhang, Y. R., Grignard, A., Noyman, A., Sakai, Y., ElKatsha, M., . . . & Larson, K. (Jul. 2018). Cityscope: a data-driven interactive simulation tool for urban design. Use case volpe. In International Conference on Complex Systems (pp. 253-261). Springer, Cham.

New App brings LEGO® bricks to life https://www.lego.com/en-in/abontus/news/2019/october/lego-ar-studio/ Published Dec. 4, 2017.

Go ghost hunting with LEGO® Hidden Side https://www.lego.com/en-us/themes/hidden-side.

Wang, X., Ong, S. K., & Nee, A. Y. (2016). A comprehensive survey of augmented reality assembly research. Advances in Manufacturing, 4(1), 1-22.

Qian K., Building Simplification—A fabrication method based on Augmented Reality in Intelligent & Informed—Proceedings of the 24th CAADRIA Conference—vol. 1, M. Haeusler, M. A. Schnabel, T. Fukuda (eds.), Victoria University of Wellington, Wellington, New Zealand, Apr. 15-18, 2019, pp. 495-504.

Abe, U., Hotta, K., Hotta, A., Takami, Y., Ikeda, H. and Ikeda, Y., Digital Construction—Demonstration of Interactive Assembly Using Smart Discrete Papers with RFID and AR codes, in Protocols, Flows, and Glitches—Proceedings of the 22nd CAADRIA Conference, P. Janssen, P. Loh, A. Raonic, M. A. Schnabel (eds.), Xi'an Jiaotong-Liverpool University, Suzhou, China, Apr. 5-8, 2017, pp. 75-84.

Jahn, G.; Newnham, C.; Beanland, M., in Proceedings of the 38$^{th}$ Annual Conference of the Association for Computer Aided Design in Architecture (ACADIA), Mexico City, Mexico Oct. 18-20, 2018, pp. 88-97.

Hahm. S., Maciel, A., Sumitiomo, E. and Lopez Rodriguez, A. FlowMorph—Exploring the human-material interaction in digitally augmented craftsmanship, in Intelligent & Informed—Proceedings of the 24th CAADRIA Conference—vol. 1, M. Haeusler, M. A. Schnabel, T. Fukuda (eds.), Victoria University of Wellington, Wellington, New Zealand, Apr. 15-18, 2019, pp. 553-562.

Bottani, E., & Vignali, G. (2019). Augmented reality technology in the manufacturing industry: A review of the last decade. IISE Transactions, 51(3), 284-310.

Legolizer, LEGO 21036 Arc de Triomphe digital model. https://www.tarbosquid.com/3d-models/paris-lego-arctriomphe-3d-1263341 Mar. 11, 2018.

LEGO Architecture. 21036 Arc de Triomphe digital model. 2017. https://www.lego.com/biassets/bi/6206288.pdf.

Design Insights From LEGO https//medium.com/@DanChambers/design-insights-fromlego-fd937aed37d4 Published Oct. 16, 2015.

Olson, E. (May 2011). AprilTag: A robust and Ylexible visual Yiducial system. In 2011 IEEE International Conference on Robotics and Automation (pp. 3400-3407). TEEE.

BRICKxAR demo video, Augmented Reality for LEGO® Construction with iPhone® —LEGO Arc de Triomphe Speed Build with AR Posted May 31, 2019, available on-line at: https://youtu.be/7JDW_1Dv7FU.

File: Tombe du soldat inconnu, Paris, 2005.jpg Tomb of the Unknown Soldier in Paris, 2005 https://commons.wikimedia.org/wiki/File:Tombe_du_soldat_inconnu, Paris, 2005.jpg.

File: Le triomphe de 1810, Jean-Pierre Cortot, Arc triomphe Paris.jpg Artwork on L'Arc Triomphe, represents Napoleon's 1810 victory. The figure above Napoleon represents Fame and the female figure to the right of Napoleon represents Victory putting a crown on Napoleon's head. https://commons.wikimedia.org/wiki/File:Le_triomphe_de_1810. Jean-Pierre Cortot. Arc triomphe Paris.jpg.

Denis Trufanov, Flag of France model and animation, https://assetstore.unity.com/packages/3d/props/exterior/animated-cloth-Ylags-133600.

Shaik, K. B., Ganesan, P., Kalist, V., Sathish, B. S., & Jenitha, J. M. M. (2015). Comparative study of skin color detection and segmentation in HSV and YCbCr color space. Procedia Computer Science, 57, 41-48.

Marc Mons, Arc de Triomphe CAD model, https://www.turbosquid.com/3d-models/arc-triomphe-paris-3d-1281816 2018.

(56) References Cited

OTHER PUBLICATIONS

Martin, C. V. (2007). Usability of pictorial toy assembly instructions for young children. Unpublished doctoral dissertation, Virginia Polytechnic Institute and State University, Blacksburg, 265 pages.
Martin, C. V., & Smith-Jackson, T. L. (2008). Evaluation of pictorial assembly instructions for young children. Human factors, 50(4), 652-662.
New Apple patent filing shows a mixed reality headset that tracks your whole face. https://www.theverge.com/2019/7/22/20705158/applemixed-reality-headset-ar-glasses-patent-application-facetracking Published Jul. 22, 2019.
LEGO responds to instructions issue in 42056 Porsche 911 GT3 RS https://brickset.com/article/21758/lego-responds-toinstructions-issue-in-42056-porsche-911-gt3-rs Posted Jun. 2, 2016.
Abate, A. F., Narducci, F., & Ricciardi, S. (Jun. 2014). An image based approach to hand occlusions in mixed reality environments. In International Conference on Virtual, Augmented and Mixed Reality (pp. 319-328). Springer, Cham.
Apple unveils ARKit 3 with people occlusion, motion capture, multiple face tracking, and more. https://9to5mac.com/2019/06/03/apple-arkit-3/ Posted Jun. 3, 2019.
Lumin OS 0.97 and SDK 0.22 https://www.magicleap.com/news/product-updates/lumin-os.0.97-and-sdk-0-22 Posted Jul. 23, 2019.
BRICKxAR LinkedIn Article: https://www.linkedin.com/pulse/augmented-reality-legoconstruction-iphone-wei-yan/ posted Jun. 1, 2019.
BRICKxAR Facebook post: https://www.facebook.com/wei.yan.7393%2Fposts%2F10216042981279598 posted Jun. 1, 2019.

* cited by examiner

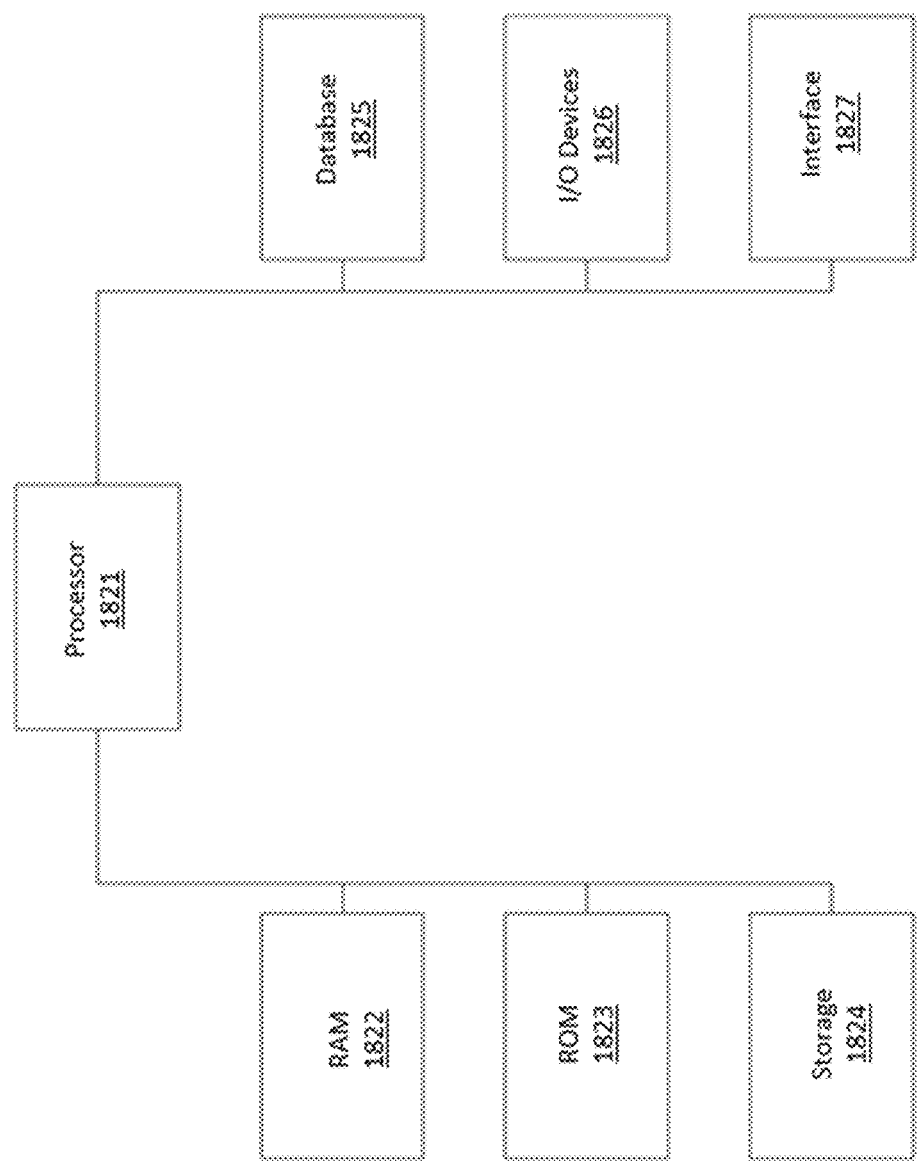

SYSTEMS AND METHODS PERFORMING OBJECT OCCLUSION IN AUGMENTED REALITY-BASED ASSEMBLY INSTRUCTIONS

BACKGROUND

Major construction projects are increasingly complex. In recent years, LEGO sets also have become more complex and labor intensive. Some sets have thousands of pieces, and an instruction booklet can have hundreds of pages and a building project can take several days, with players' "moods sliding from frustration to joy and back again". In the meantime, AR can help by "putting the answers right where the questions are", which can significantly benefit manufacturing, building construction, and part assembly. AR has also been experimented for education and research.

Therefore, what is needed are systems and methods for performing object occlusion in an augmented reality environment. Specifically, a precise and accurate method for performing object occlusion and providing assembly instructions.

SUMMARY

To improve augmented reality environments and to overcome the limitations of conventional augmented reality techniques, systems and methods are disclosed for performing object occlusion in augmented reality environments.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

In one aspect, the present disclosure relates to a method for performing object occlusion in augmented reality-based step-by-step instructions for an assembly. In one embodiment, the method includes: capturing an image of a physical item; determining a location and an orientation of a first virtual item in the image with an augmented reality registration function; generating an augmented reality image, wherein the augmented reality image comprises a rendering of a first virtual item in the image using a first rendering function to depict the location and orientation of the first virtual item in the image and a rendering of a second virtual item in the image with a second rendering function; and displaying the augmented reality image, wherein occlusion of the first virtual item by the physical item is shown in the augmented reality image based on occlusion of the first virtual item by the second virtual item, wherein the first virtual item depicts a next step in the step-by-step instructions for the assembly.

In one embodiment, the first rendering function is a shaded shader or a partially transparent wireframe shader and the second rendering function is a transparent and occlusive shader.

In one embodiment, the image includes a location and orientation marker, wherein determining the location and orientation of the first virtual item is based on the location and orientation marker in the image.

In one embodiment, the physical item partially occludes the location and orientation marker.

In one embodiment, the first virtual item depicts a next step in the step-by-step instructions for the assembly.

In one embodiment, upon completion of the next step in the step-by-step instructions for the assembly, the second rendering function shader is used to render the first virtual item.

In one embodiment, the location and orientation marker includes a first patterned area, a second patterned area, a first blank area, and a second blank area.

In one embodiment, the first virtual item, second virtual item, and physical item are toy bricks.

In one aspect, the present disclosure relates to a method of performing occlusion and grabbing of a virtual item by a body part in an augmented reality environment. In one embodiment, the method includes: capturing an image of a physical item and a grabbing body part; determining a location of the body part in the image based on the image of the body part; determining a location and an orientation of a virtual item with an augmented reality registration function; generating an augmented reality image, wherein the augmented reality image comprises a rendering of the virtual item in the image using a first rendering function to depict the location and orientation of the virtual item in the image; and a rendering of the body part with a second rendering function that occludes the virtual item wherein the body part is represented with a virtual object shape configured to occupy the area of the body part in the image; and displaying the augmented reality image, wherein occlusion and grabbing of the virtual item by the body part are shown in the augmented reality image based on occlusion of the virtual item by the virtual object shape.

In one embodiment, the body part is a hand.

In one aspect the present disclosure relates to a system for performing object occlusion in an augmented reality environment. In one embodiment, the system includes a processor; and a memory coupled to the processor, wherein the memory stores instructions which when executed by the processor cause the system to: capture an image of a physical item; determine a location and an orientation of a first virtual item in the image with an augmented reality registration function; generate an augmented reality image, wherein the augmented reality image comprises a rendering of the first virtual item in the image using a first rendering function to depict the location and orientation of the first virtual item in the image and a rendering of a second virtual item in the image using a second rendering function; and display the augmented reality image, wherein occlusion of the first virtual item by the physical item is shown in the augmented reality image based on occlusion of the first virtual item by the second virtual item; wherein the first virtual item depicts a next step in a set of step-by-step instructions for the assembly.

In one embodiment, the first rendering function is a shaded shader or a partially transparent wireframe shader, and the second rendering function is a transparent and occlusive shader.

In one embodiment, the image further includes a location and orientation marker, wherein determining the location and orientation of the first virtual item is based on the location and orientation of the marker in the image.

In one embodiment, the physical item at most partially occludes the location and orientation marker.

In one embodiment, the first virtual item depicts a next step in a sequence of assembly steps.

In one embodiment, upon completion of the next step in the sequence of assembly steps, the second rendering function is used to render the first virtual item.

In one embodiment, the location and orientation marker includes a first patterned area, a second patterned area, a first blank area, and a second blank area.

In one embodiment, the first virtual item, second virtual item, and physical item are toy bricks.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 18 illustrates an exemplary computer that may comprise all or a portion of the system for performing object occlusion in an augmented reality environment; conversely, any portion or portions of the computer illustrated in FIG. 18 may comprise all or a portion of the system performing object occlusion in an augmented reality environment, or a control system; conversely.

DETAILED DESCRIPTION

Figure 1:
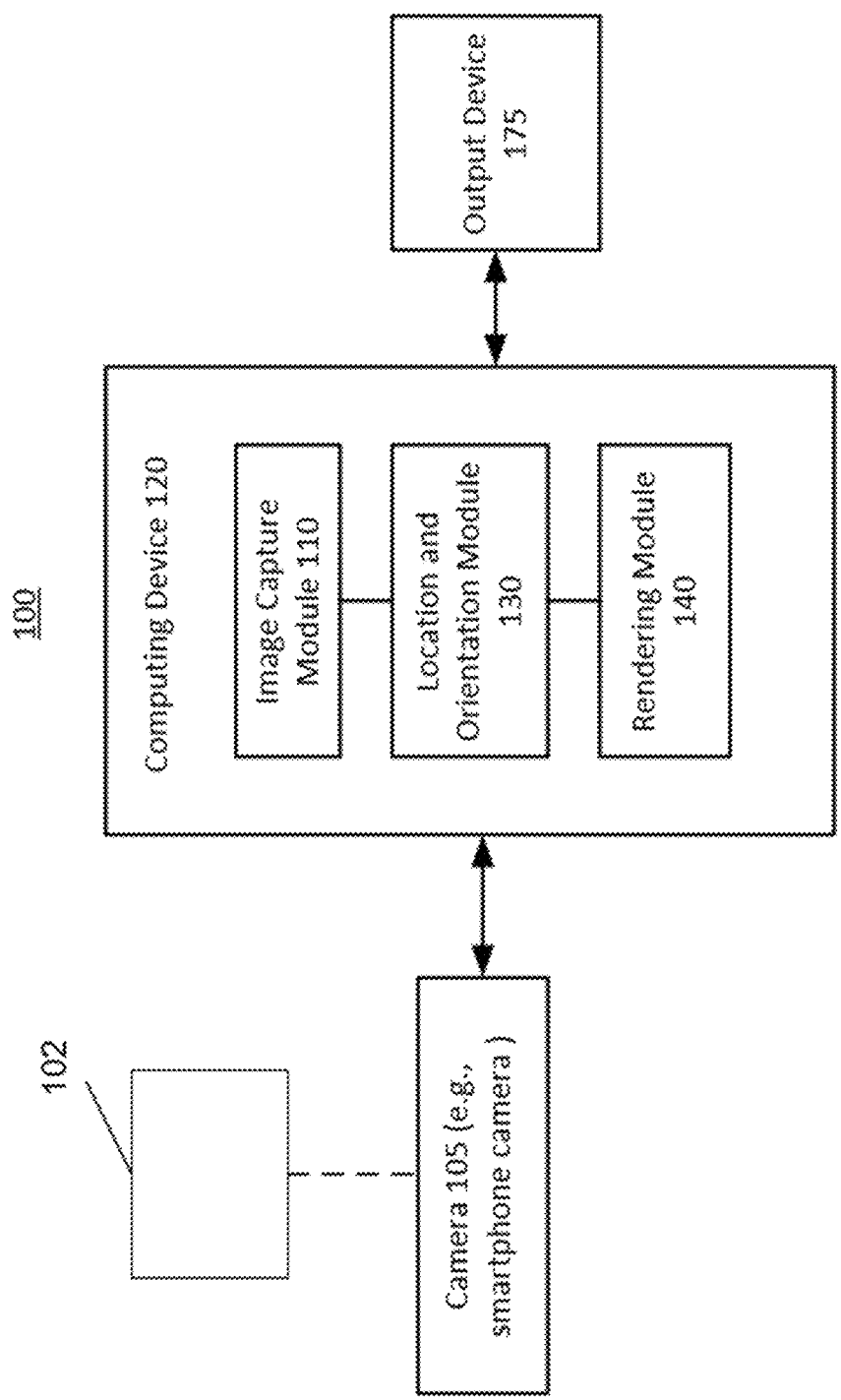
FIG. 1 is an illustration of an exemplary environment for performing object occlusion in augmented reality-based assembly instructions.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Throughout the present disclosure the term "BRICKxAR" is a non-limiting reference to embodiments of the present disclosure. Additionally, throughout the present disclosure, the terms "real object" and "physical object" may be used interchangeably to refer to images of objects that exist in the unmodified image, while "virtual object" may be used to refer to images added to the augmented reality image by the augmented reality system.

FIG. 1 is an illustration of an exemplary environment 100 for performing object occlusion. The environment 100 may include a camera 105, a computing device 120, and an output device 175. The camera 105 may be a smartphone camera or other camera. The computing device 120 is in communication with the camera 105. The camera 105 can capture an image of a scene 102, which can be transmitted to the computing device 120. The output device 175 may comprise a display, speakers, a printer, and/or other computing device. In some embodiments, the output device 175 may comprise a pair of augmented reality goggles, or augmented reality glasses or other augmented reality hardware.

The computing device 120 contains an image capture module 110, a location and orientation module 130, and a rendering module 140. Depending on the embodiment, the modules 110, 130, 140 may be implemented by the same computing device or by different computing devices. Moreover, some of the modules 110, 130, 140 may be implemented completely, or in part, by a cloud-computing environment.

Figure 2:
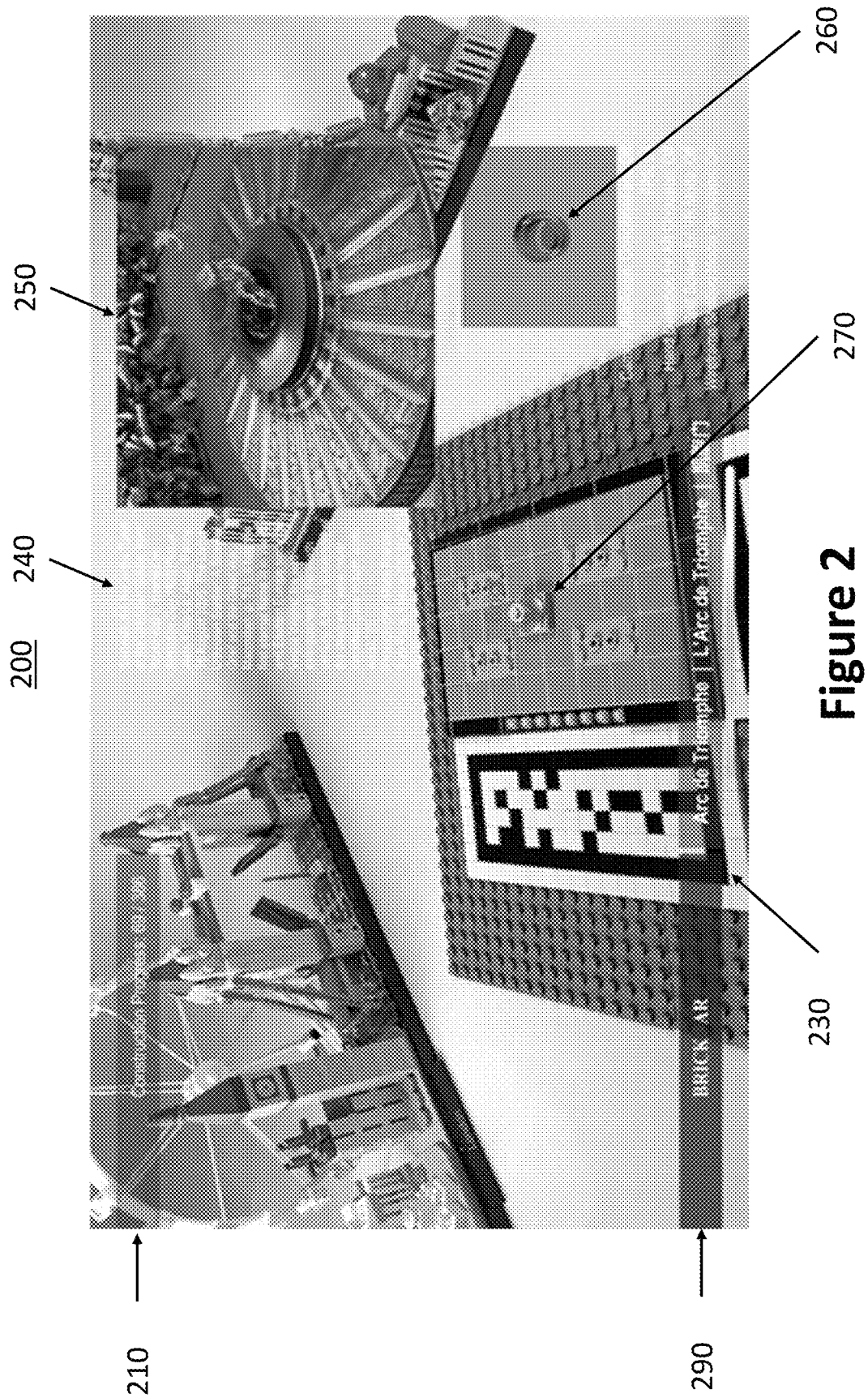
FIG. 2 illustrates an interface for displaying information related to an assembly step and a labelled brick related to the assembly step.

With reference to FIG. 2, a non-limiting example of an output image 200 that can appear on the output device 175 is illustrated. A "construction progress" indicator 210 shows the user what step of an assembly the user has completed. The assembly may be a LEGO assembly or another type of brick-based assembly. A text data panel 240 and an image data panel 250 are included to show the user information related to the assembly. A data panel 260 shows information about the current part 270 that is being placed into the scene. The location and orientation marker 230 is shown at the bottom of the illustration.

Historical, construction, architectural, and other information can be provided at different points of the assembly process. Architecture and construction information can be displayed on the user interface 290 for specific, relevant steps. For example, with reference to FIG. 2, information 240 about an architectural feature is displayed along with a depiction 250 of the architectural feature.

Figure 3:
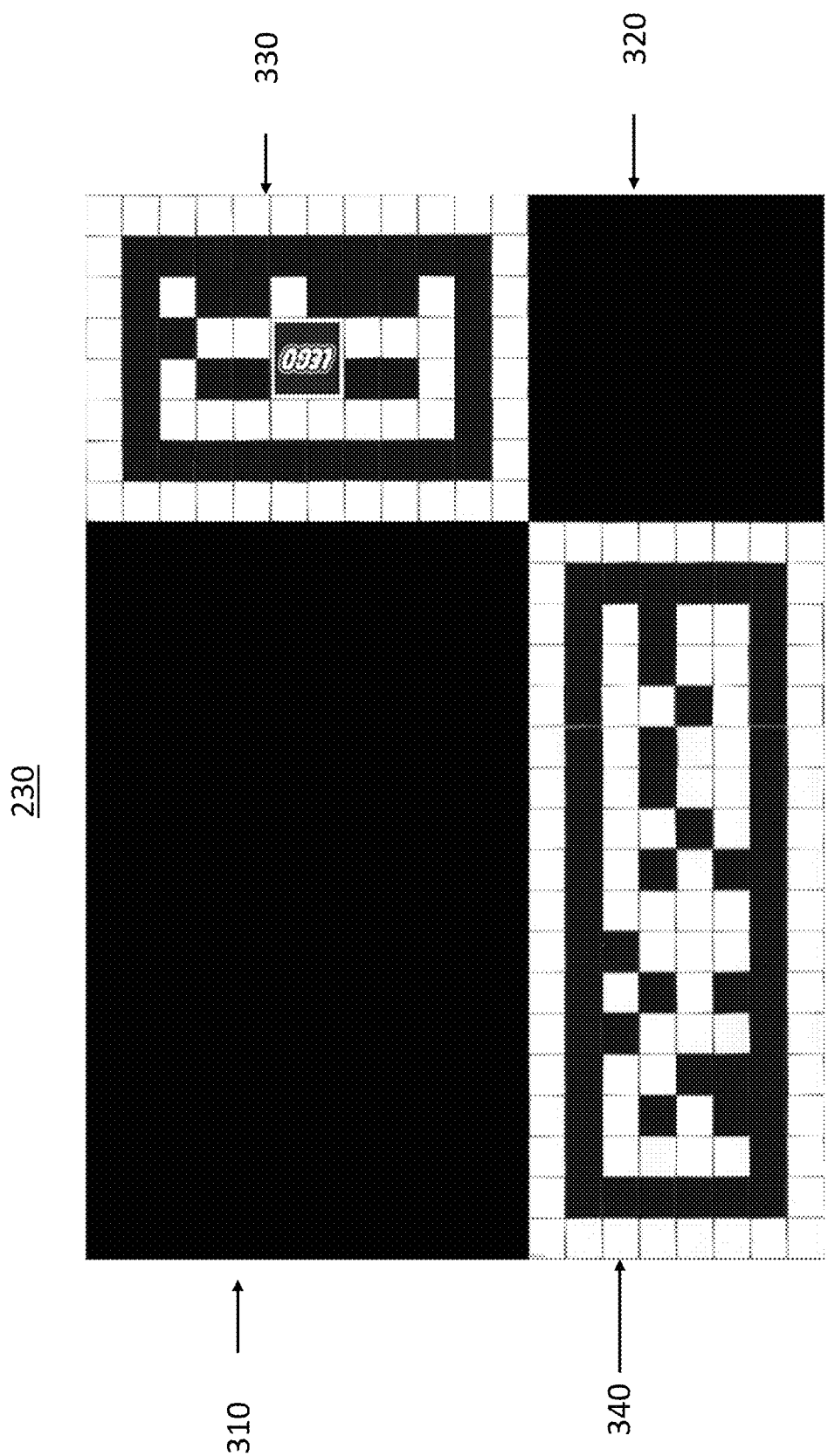
FIG. 3 illustrates an orientation marker used for image detection and tracking.

With reference to FIG. 3, non-limiting example of a location and orientation marker 230 is shown. The location and orientation marker 230 includes two black regions 310 and 320 and two patterned regions 330 and 340. The location and orientation module 130 can use a marker placed within the scene 102 to determine the position and orientation of real and virtual objects within the scene. The physical object (e.g. the model being constructed) can occlude the location and orientation marker 230.

The location and orientation module 130 can be used to transform the virtual model accurately and precisely to the right scale, location, and orientation for the best alignment possible between the virtual and real models. A single-marker method and a two-marker method were tested. With reference to FIG. 3, an location and orientation marker 230 is shown with two image patterns 330 and 340. Using the image patterns 330 and 340 as two separate markers, two transformations of the virtual model were calculated, one from each marker. Then a linear interpolation was used to obtain the final transformation of the virtual model. Alternatively, the two image patterns 330 and 340 can be combined into a larger, single image, with black regions 310 and 320 filling the empty areas. This can become an accurate and robust image marker, and was used to perform the experiment using this embodiment of the present disclosure. This can also be flexible, for example, even if part of the image is covered, for example, the upper-left black area is later covered by the physical assembly step by step, but at each step, the image marker can be detected and tracked with high accuracy and high precision.

In some scenarios, the virtual model can drift. For example, when the marker is occluded, and the physical model is moved or rotated. However, embodiments of the present disclosure can be configured to re-align the virtual and physical models when the marker is no longer occluded.

In addition to the marker-based approach, 3D point cloud SLAM (Simultaneous Localization and Mapping) is contemplated. Additionally, a true-depth camera capable of determining the real model's 6-DoF (Degree of Freedom) pose with sufficient accuracy is also contemplated.

Figure 4:
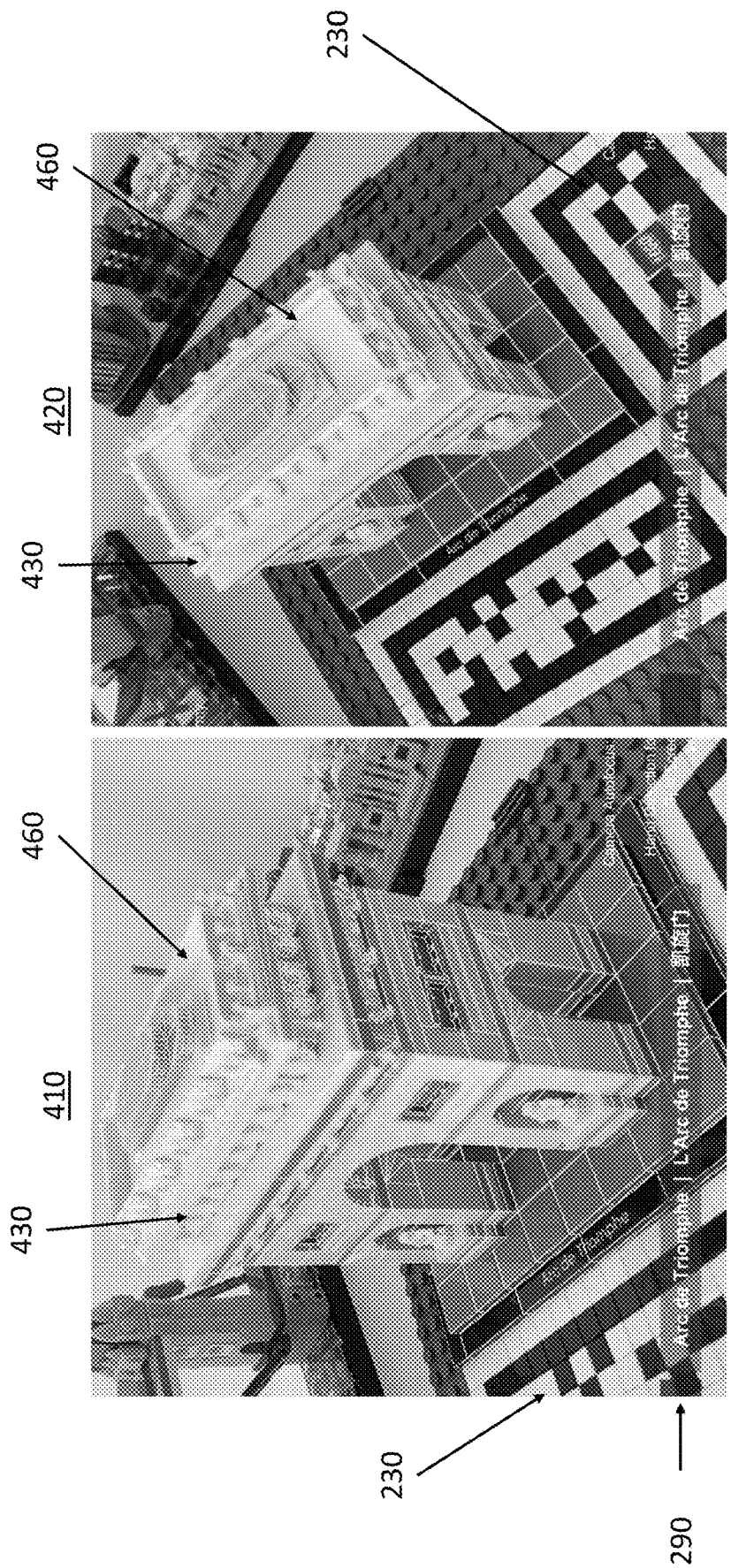
FIG. 4 illustrates wireframe model of the assembled set of toy bricks overlaid onto an illustration of the fully assembled set of toy bricks.

With reference to FIG. 4, a first view 410 and a second view 420 are shown of the same model. In both the first view 410 and the second view 420 a wireframe 430 is shown. In some scenarios, the average alignment error between the wireframe 430 and the assembled model 460 can be smaller than 1 mm across the model. In this context, error is calculated as the distance between the corresponding edges on the virtual and physical models, obtained through visual checking and manual measurement of sample screenshots. However, alternative measures of error are contemplated. The properties of the digital model, and the actions of the user, can impact the level of error. For example, the fidelity of the original digital model by its creator, and the attachment of real bricks being tighter or looser with slight, free rotations made by the player, can increase the error. Further, the image tracking algorithm employed, and the marker used, and the marker size, can also impact the level of error. The average error of the registration can be less than 1 mm throughout the entire model in embodiments of the present disclosure, as illustrated in FIG. 4, where the wireframe 430 closely aligns to the assembled model 460.

In embodiments of the present disclosure, the physical model can be moved and rotated freely on the work surface, and the AR device camera 105 can have a 6-DoF pose. Embodiments of the present disclosure can have high accuracy (i.e. very accurate mean localization) and high precision (i.e. very small variance of localization) of AR registration (i.e. the virtual model's alignment with the physical model). This can be performed through Computer Vision techniques using the camera 105 and motion sensors (including gyroscope, accelerometer and magnetometer) that may be included as inputs to the computing device 120.

Figure 5:
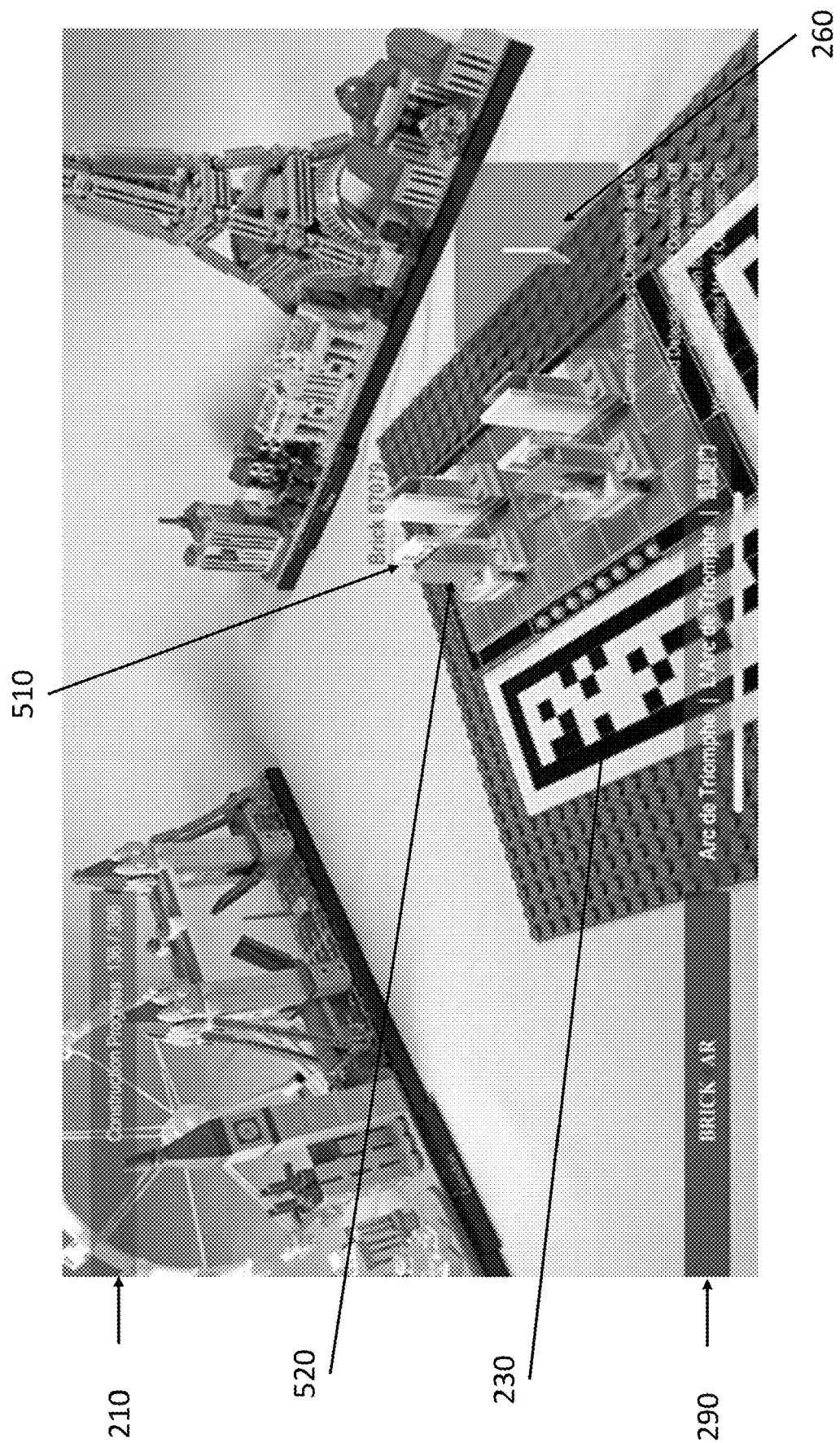
FIG. 5 shows an illustration of a partially assembled set of toy bricks, including occlusion between a real and virtual brick.
Figure 6:
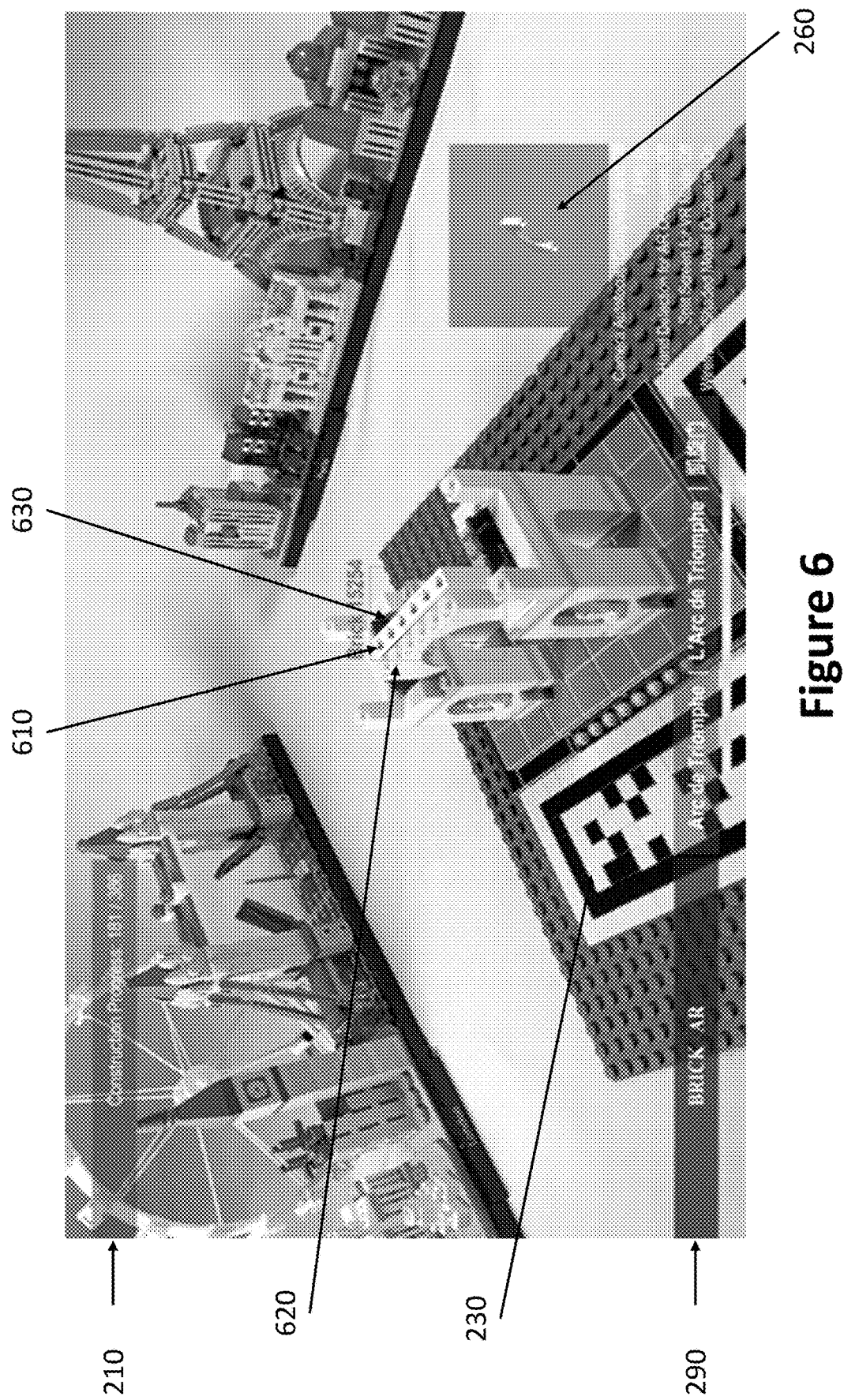
FIG. 6 shows an illustration of a partially assembled set of toy bricks, including occlusion between real and virtual bricks.

With reference to FIGS. 5 and 6, a non-limiting example of real-virtual and virtual-real occlusion performed by an embodiment of the present disclosure is shown. For example, with reference to FIG. 5, a virtual brick 510 is shown, and the virtual brick 510 is occluded by the real brick 520 in front of the virtual brick 510. Similarly, with reference to FIG. 6, a virtual brick 610 is partially occluded by a first real brick 620, while the same virtual brick occludes a real brick 630. In the non-limiting example illustrated in FIG. 6, the virtual brick 610 appears to be behind the real brick 620. At the same time, the virtual brick 610 appears to be in front of the real brick 630.

With reference to FIG. 5, the rendering module 140 can be used to render virtual objects in the output image and perform occlusion between real and virtual objects in the scene 102 captured by the camera 105. The virtual object 510 is rendered so that it is occluded by the real object 520. The virtual object 510 represents a brick that the user should place to complete the next step.

Figure 7:
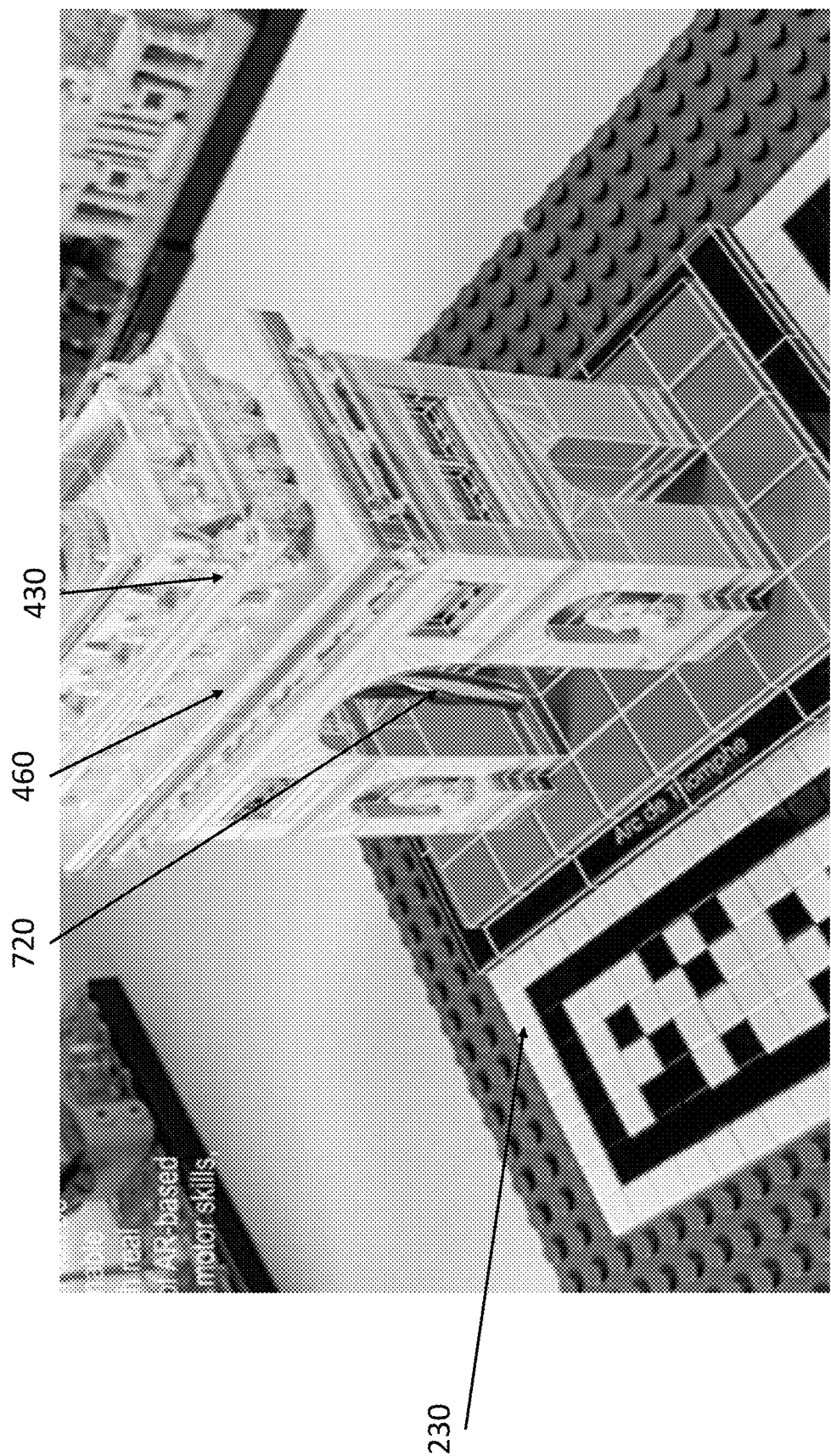
FIG. 7 shows an illustration of an assembled set of toy bricks, with a wireframe model overlaying the illustration of the scene captured, as well as a virtual flag also displayed within the illustration.

Now with reference to FIG. 6, the rendering module 140 is also capable of rendering a virtual brick 610 that both occludes and is occluded by real bricks 620 and 630, respectively. With reference to FIG. 7, many types and combinations of occlusion may be performed by the rendering module 140, for example occlusion of a virtual item 720 by a wireframe 430 that is overlaid on top of the assembled model 460.

Game components can be presented using the computing device 120 and the output device 175. For example, when the construction is completed, a song (e.g. Le Marseillaise) can be played. With reference to FIG. 7, virtual graphical elements 720 (e.g. the flag of France) can both occlude and be occluded by the virtual object (e.g. the wireframe model 430) and can appear to both occlude and be occluded by the physical object (e.g. the assembled model 460). Other game elements are possible.

A single augmented reality image can include real-virtual occlusions, as well as virtual-real occlusions, hand occlusions, and virtual-virtual occlusions in embodiments of the present disclosure. Embodiments of the present disclosure may use some, or all of these occlusions when rendering the augmented reality image including the virtual items and physical items.

Different numbers of rendering modules 140 may be used in different embodiments to render different numbers and combinations of real and virtual objects. For example, if two virtual items are included in the output image, two rendering modules may be used. The rendering modules may be configured differently, to render different virtual object types differently. The output image can be output via the output device 175.

Figure 8:
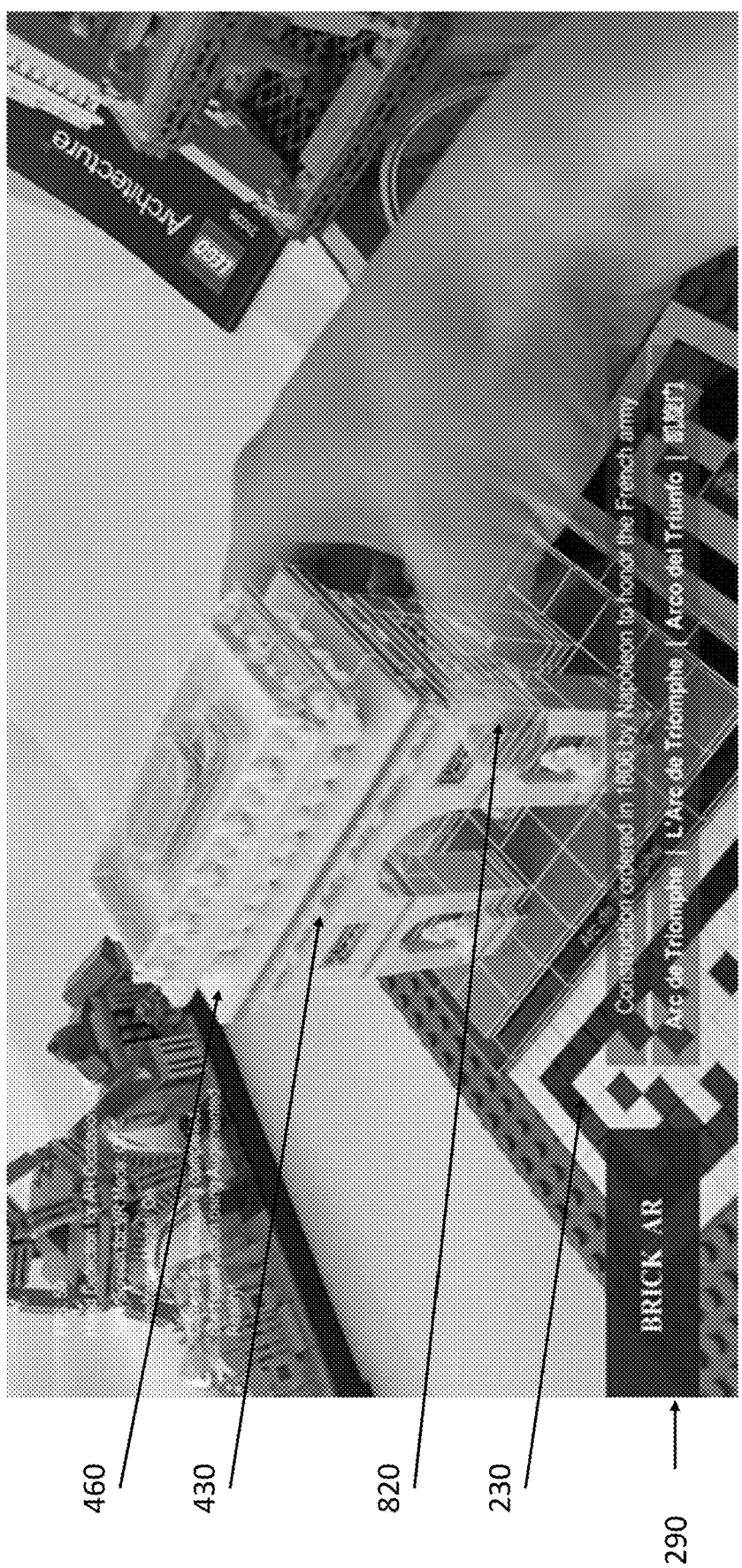
FIG. 8 illustrates how a virtual item, in this case a wireframe model, can appear in front of a hand when hand occlusion is not performed.
Figure 9:
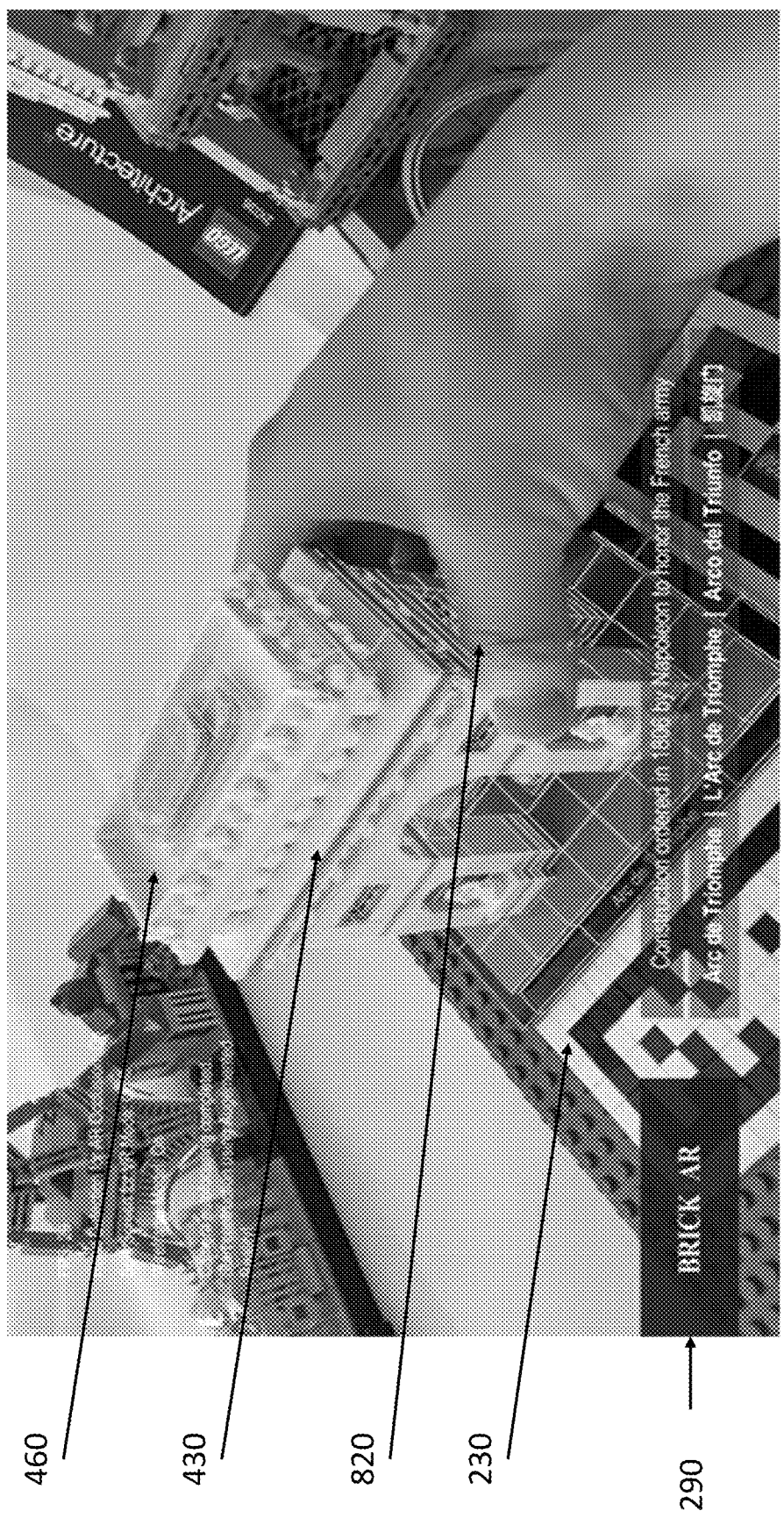
FIG. 9 shows an illustration of a wireframe model that has been occluded by a hand.

The rendering module 140 may also be configured to perform occlusion in a scene 102 that includes body parts. An image of a physical item (e.g., a brick) and a body part (e.g., a hand) can be captured by the camera 105. With reference to FIG. 8, when the rendering module 140 is not configured to perform occlusion between a body part (e.g. a thumb 820) and a virtual item (e.g. a wireframe 430) the wireframe 430 can appear to be in front of the body part 820. With reference to FIG. 9, the rendering module 140 can be configured so that the thumb 820 appears in front of the virtual item (e.g. the wireframe 430) and the hand appears to grab the virtual item.

Figure 10:
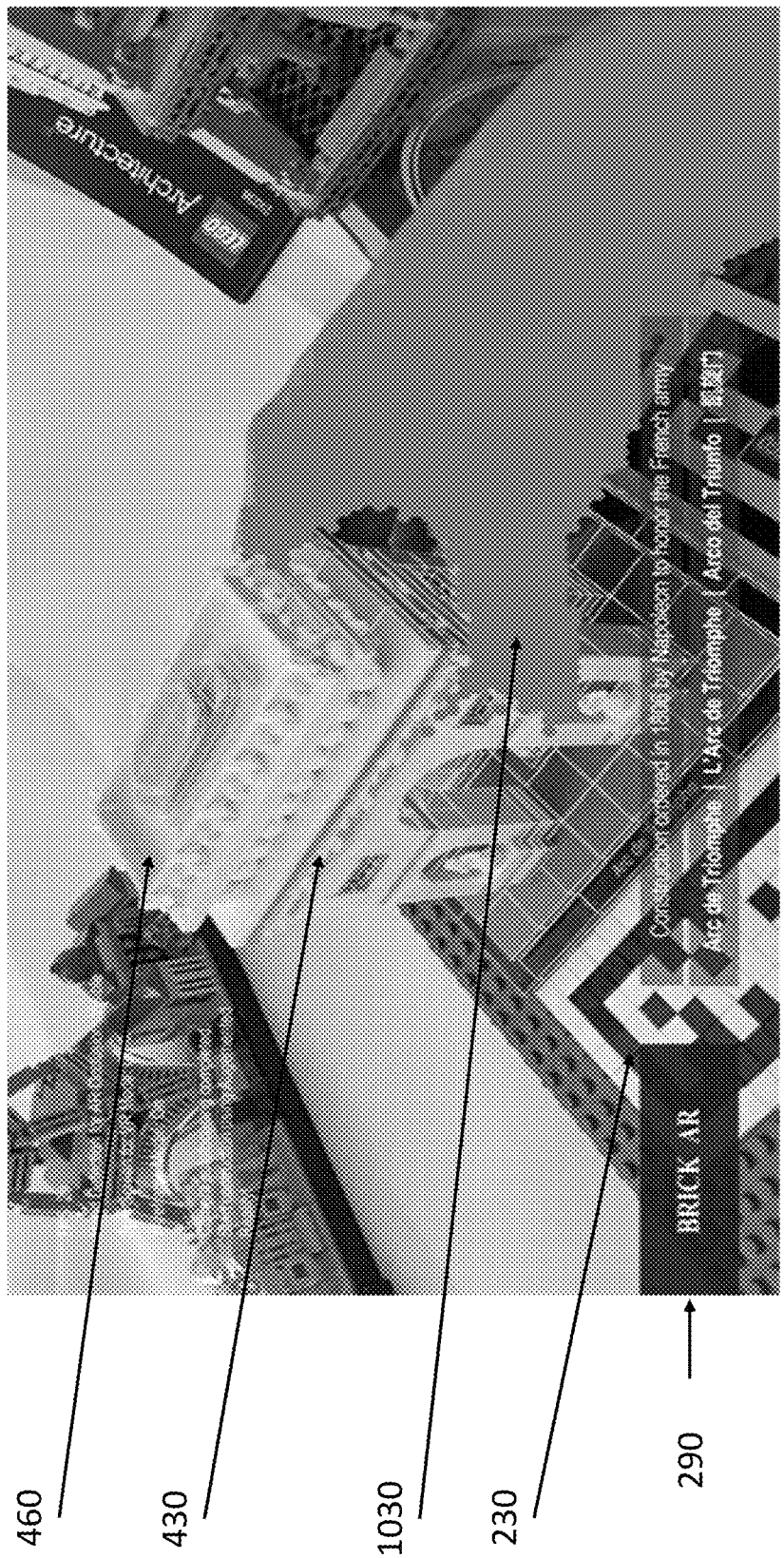
FIG. 10 shows the region identified by an exemplary hand occlusion algorithm, the area classified as being part of the hand is rendered in darkened region. The darkened region includes hexagonal virtual objects that can be rendered as transparent, but occlusive so that the real hand will occlude the wireframe model.

With reference to FIG. 10, embodiments of the present disclosure perform occlusion between virtual objects (e.g. a wireframe 430) and a body part to generate images such as the image displayed in FIG. 9. The computing device 120, and/or image capture module 110 can be configured to identify the region of the scene 102 captured by the camera 105 that includes a body part. In some embodiments of the present disclosure, the computing device 120 and/or image capture module identify the region of the image including the body part and fill that region with a plurality of virtual objects 1030. The rendering module 140 can be configured to render the plurality of virtual objects 1030 as transparent. In this context, transparent means that the plurality of virtual objects 1030 can be invisible to the user.

The rendering module 140 can also be configured to display the plurality of virtual objects 1030 as occlusive, so that the plurality of virtual objects 1030 occlude other virtual objects (e.g. the wireframe 430). In the non-limiting example shown in FIG. 10, the virtual object shape 1030 is comprised of a plurality of hexagonal virtual objects. However, different types and combinations of virtual objects can be used to create the virtual object shape 1030.

As a non-limiting example the computing device 120 and/or image capture module 110 can perform color segmentation used for detecting hands using the skin color of the hands. The target skin colors can be selected in real time by the player touching the hand area on a user interface (e.g. the screen of an iPhone) multiple times, and the colors at the two most recent touched points can be used for hand target colors. The color segmentation can also include a tolerance value for each of the skin colors. A grid array of points on screen are compared with the target colors and labeled as hand points if their color values fall into any of the target color ranges. The grid density may be adjusted. A flood-fill method is used to fill in the holes if they exist within the detected hand points. This can enable the entire hand area to be filled with Hand Occlusion Objects (i.e. virtual objects 1030), for example in case the color detection result leaves any holes because of inconsistent colors on hands due to various reasons (e.g. lighting). In addition, very small blobs resulting from color segmentation can be removed as they are can be other objects in the scene with similar colors as hands.

Figure 11:
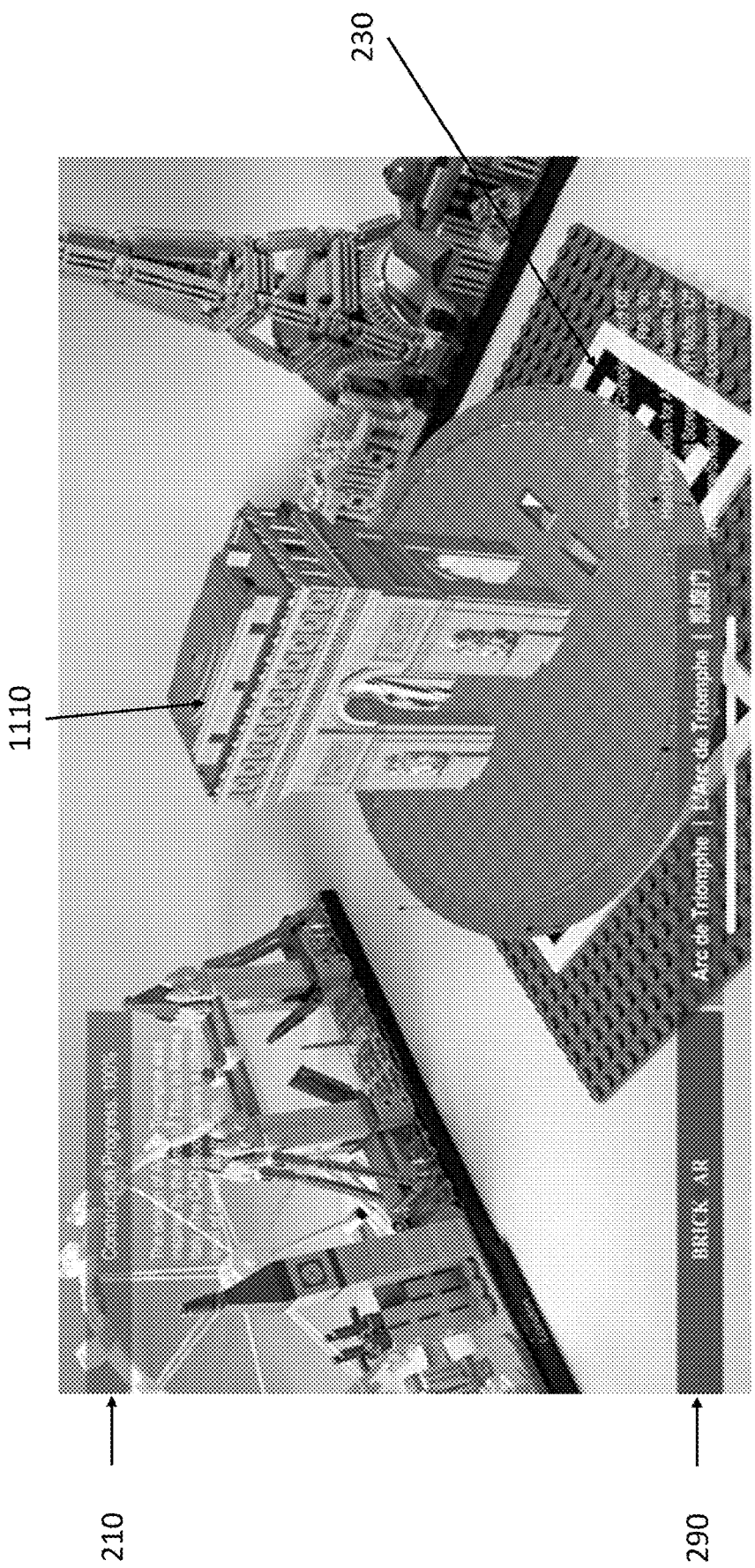
FIG. 11 illustrates a computer aided design model that occludes the set of bricks.

With reference to FIG. 11, the location and orientation module 130 can be used to orient a virtual object 1110 in place of the real object 460 shown in FIG. 10. The rendering module 140 can then render the virtual object 1110 such that it occludes the real object (not shown in FIG. 11). The real object in FIG. 11 is occluded by the virtual object 1110 and is placed on the location and orientation marker 230 that is partially occluded by the virtual object 1110. For example, the virtual object 1110 can be a Computer-Aided Design (CAD) model 1110 (e.g. a CAD model of the Arc de Triomphe) and the CAD model can allow the user to compare to the assembled model, allowing a comparison of the different levels of detail.

Figure 12:
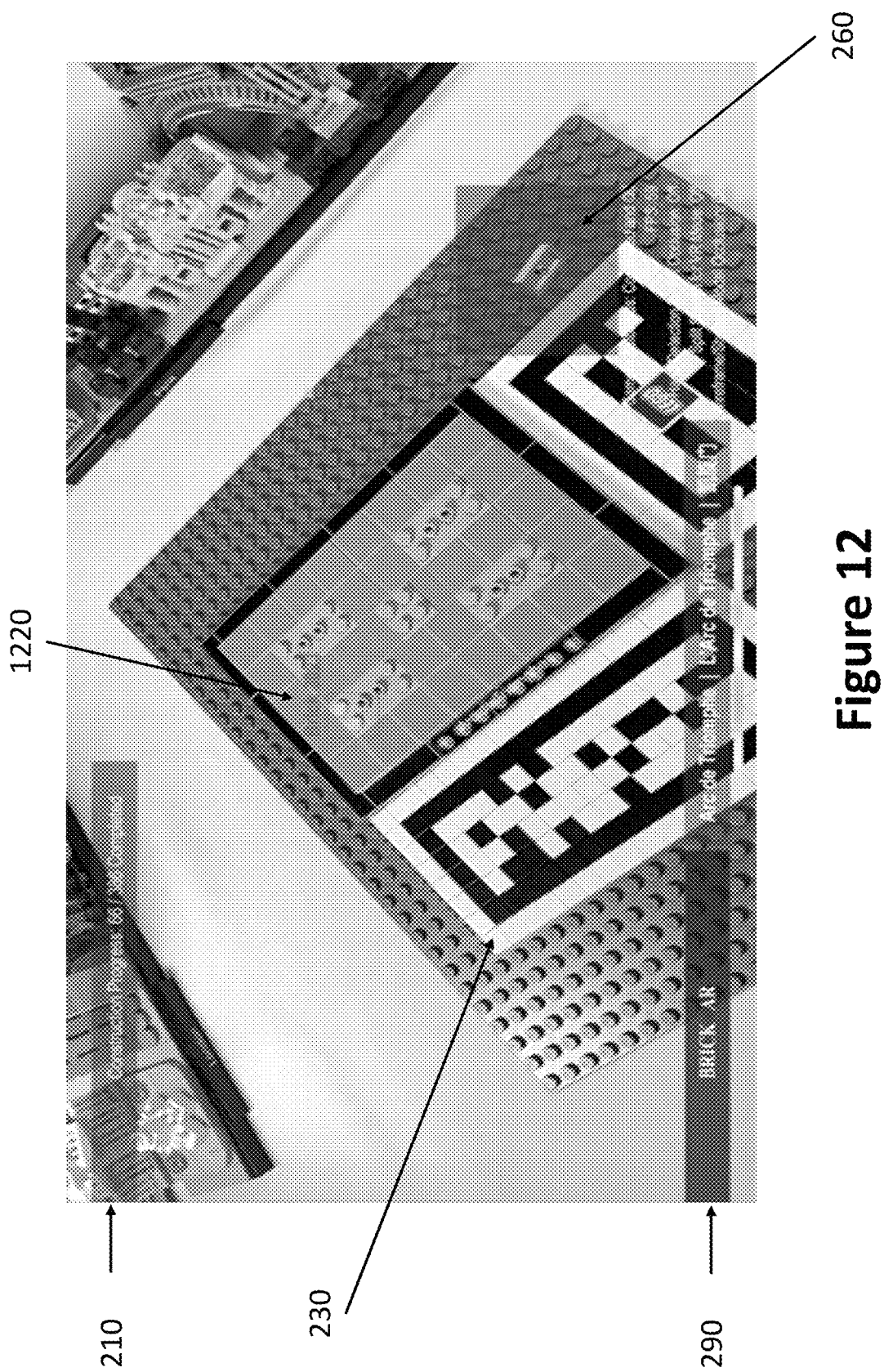
FIG. 12 illustrates an interface with a completed assembly step and an indicator showing the current assembly progress.

With reference to FIG. 12, embodiments of the present disclosure can be used to provide assembly instructions to the user during assembly of the physical model 460. The computing device 120 can store or receive assembly steps and present assembly steps to the user. The output device 175 can show the user the construction progress 210, as well as both the location where the next item in the construction should be placed 1220 and a depiction 260 of the next item to be placed. The location and orientation module 130 can determine the correct location and orientation of the next item displayed in the data panel 260, using the location and orientation marker 230 that is included in the scene 102 captured by the camera 105.

Figure 13:
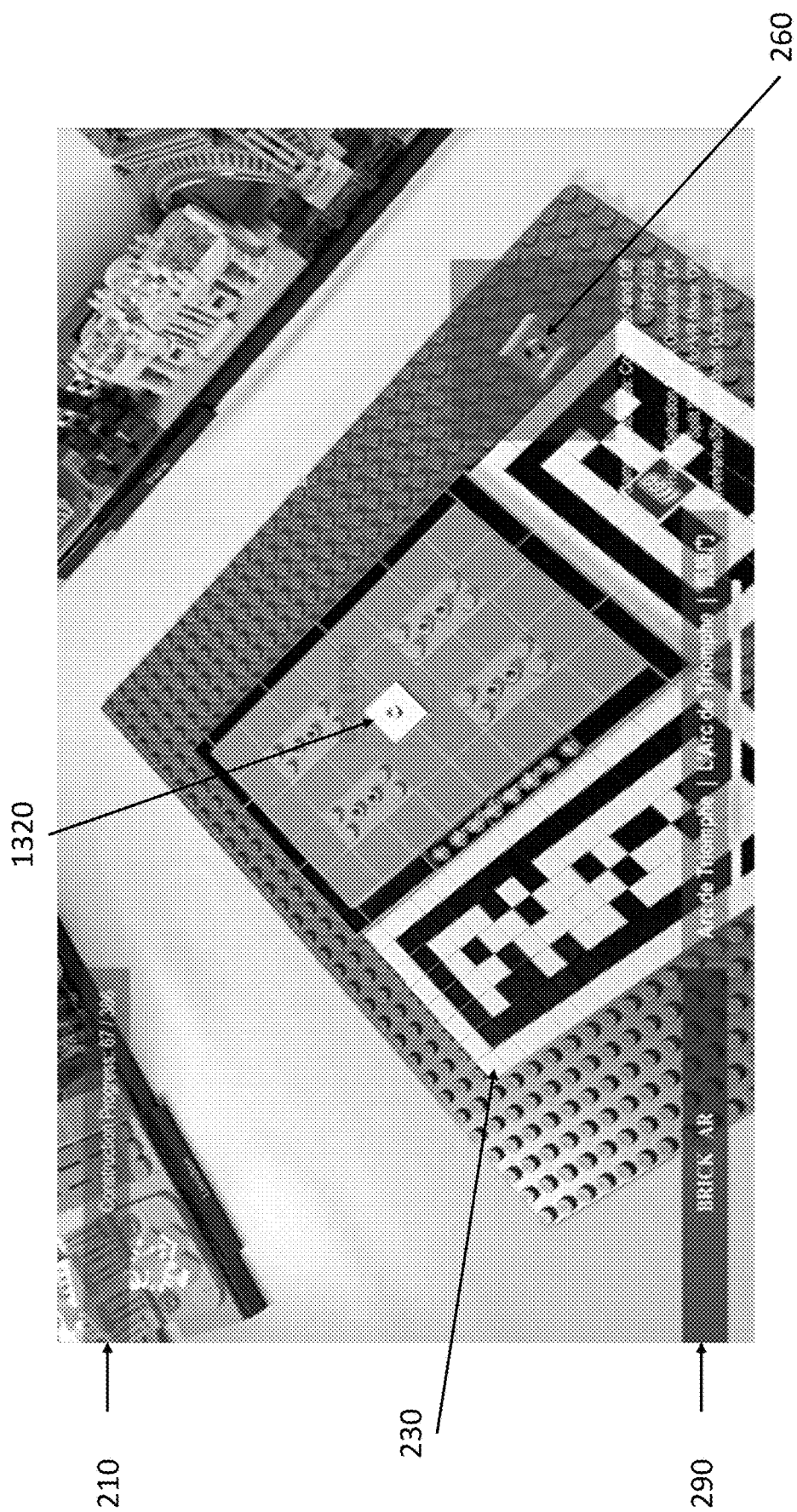
FIG. 13 illustrates a shaded virtual brick depicting a current assembly step.

With reference to FIGS. 13 to 16, embodiments of the present disclosure relate to methods for performing object occlusion and detection of step completion during an assembly step. With reference to FIG. 13, embodiments of the present disclosure can detect the completion of an assembly step.

With reference to FIG. 13, the rendering module 140 can depict the virtual item 1320 as a shaded virtual item that fully occludes objects beneath the shaded virtual item. Again, as in FIG. 12, the location and orientation marker 230 can be used to determine the location and orientation of the virtual item 1320. The construction progress indicator 210 can also be displayed during this step.

Figure 14:
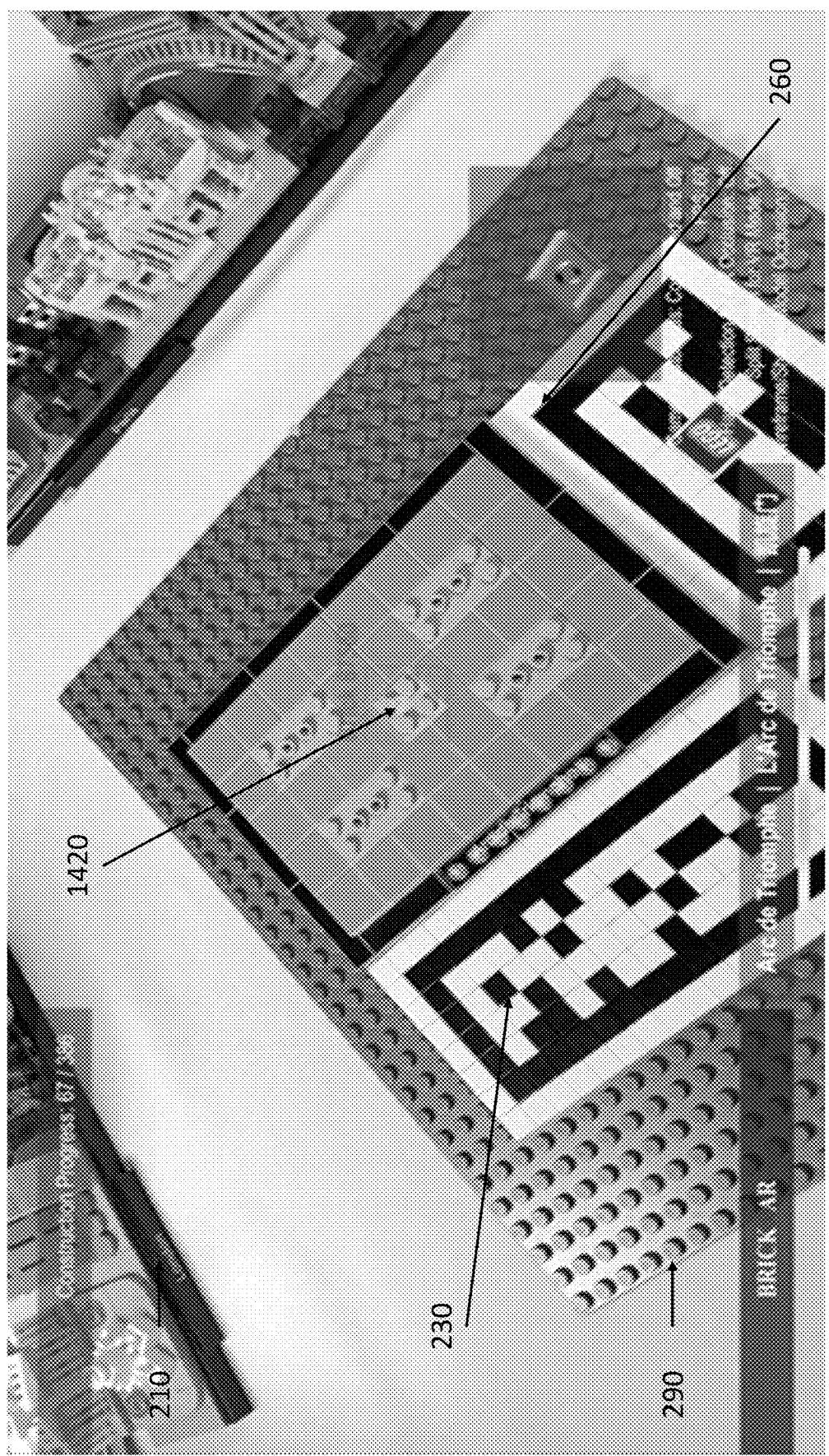
FIG. 14 illustrates a wireframe virtual brick displayed after a shaded rendering.

With reference to FIG. 14, the rendering module 140 can render a virtual item as a wireframe virtual item 430.

Figure 15:
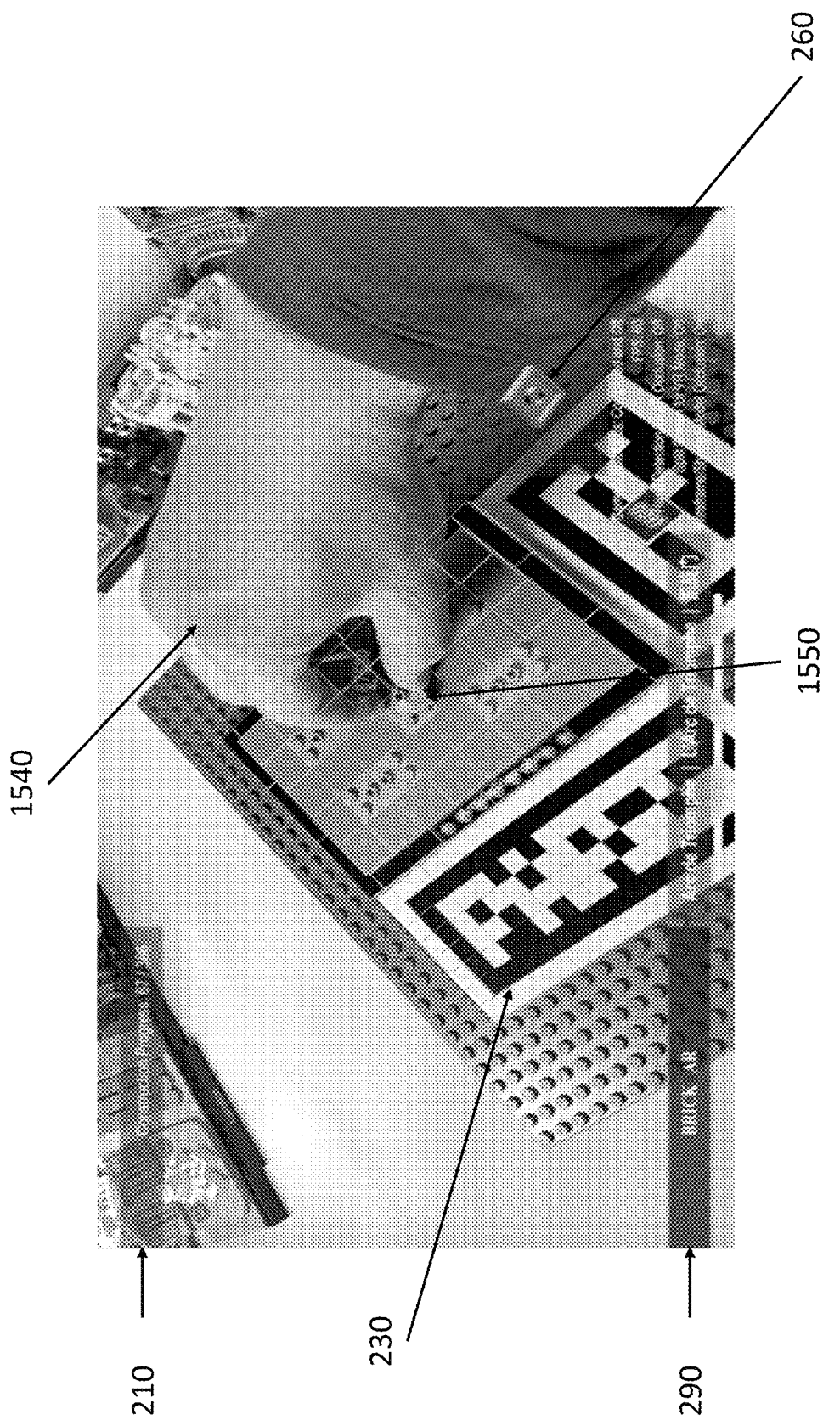
FIG. 15 illustrates a physical brick inserted into the location of the wireframe virtual brick depicted in FIG. 14.
Figure 16:
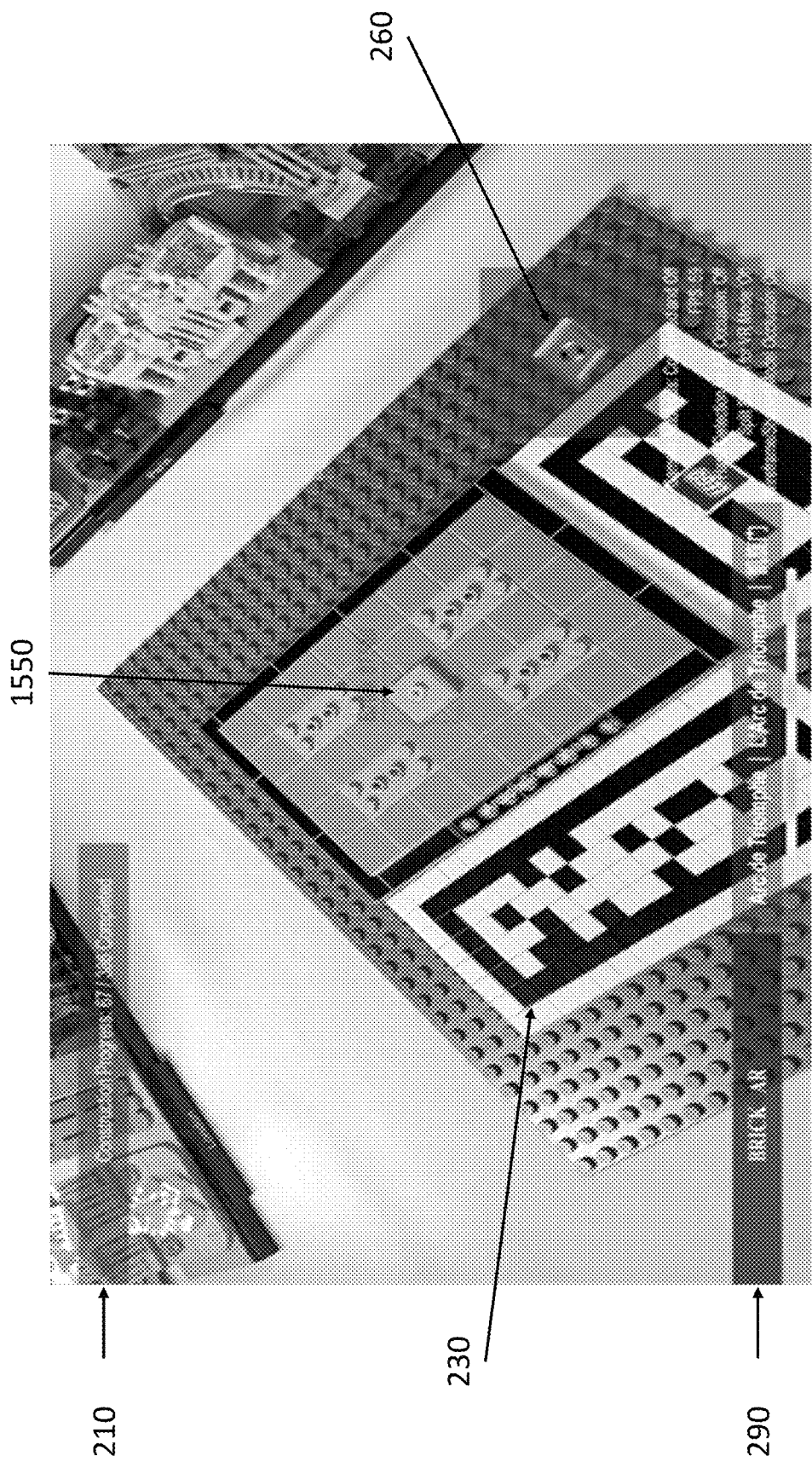
FIG. 16 illustrates the interface after a real brick has been inserted in the location of the wireframe virtual brick.

With reference to FIG. 15, an assembly step is shown. A hand 1540 places a real item (e.g. a brick) 1550 in the place where the wireframe virtual item 1420 was displayed in FIG. 14. With reference to FIG. 16, the real item 1550 has been inserted into place. The computing device 120 can determine that the assembly step has been completed based on the location and orientation marker 230, image capture module 110, image rendering module 140, and location and orientation module 130. The construction progress indicator 210 in the output device 175 can be increased upon the computing device 120 detecting that the assembly step has been completed. Further, the computing device 120 and rendering module 140 may change how the virtual item 1420 is represented. For example, at the beginning of the assembly step, the output device 175 may show the virtual item as a shaded virtual item 1320, but while the user is performing the assembly step the virtual item can be shown as a wireframe virtual item 1420. The rendering module 140 may be configured to perform rendering modes other than shaded and wireframe.

Embodiments of the present disclosure relate to an Augmented Reality (AR)—based instruction method of providing assembly instructions. Embodiments of the present disclosure can provide assembly instructions so that assembly steps can be provided to a user without instruction booklets. Construction of a model (e.g. a model of toy bricks) can be guided by virtual bricks depicted in the right place at the right time, step by step. Information can be displayed in the augmented reality environment, including information related to architecture and construction by which the right steps of building are augmented. Virtual and real object occlusions can be implemented. As a non-limiting example, occlusion between virtual and real objects can be performed that depicts a natural appearance of virtual bricks behind or between real bricks. Additionally, occlusion of body parts, including hands can be performed. As a non-limiting example, hand occlusion can be performed to allow a realistic immersive AR experience in which virtual bricks appear to be grasped by real hands, with real bricks actually grabbed.

Figure 17:
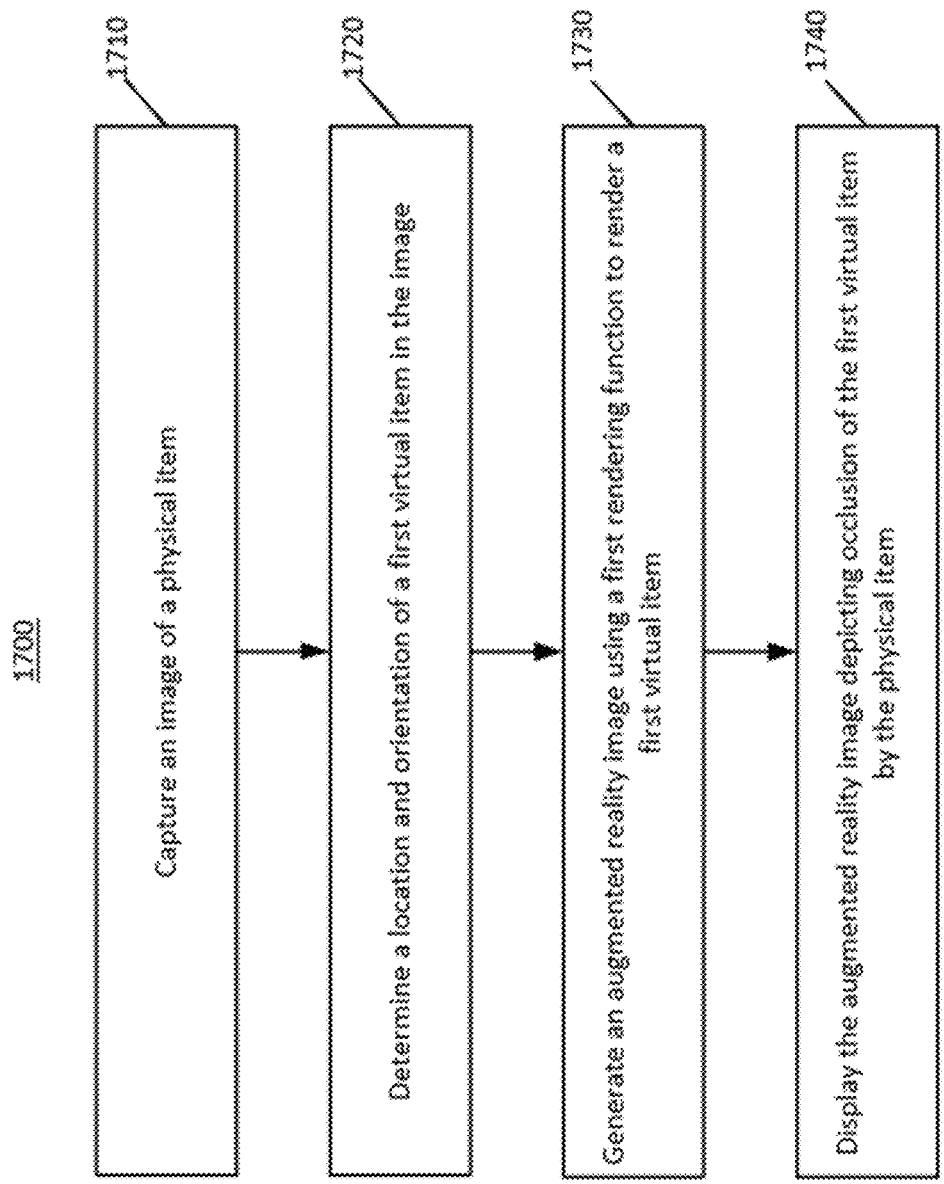
FIG. 17 illustrates an exemplary method for performing object occlusion.

With reference to FIG. 17, embodiments of the present disclosure relate to methods 1700 for performing occlusion between real and virtual objects in an assembly step.

At 1710, an image of a physical item is captured. The image of the physical item may be captured by a camera 105 or a smart phone or other computing device. The physical item may be a brick assembly.

At 1720, the location and orientation of a virtual item in the image is determined. The location and orientation of the virtual item may be determined by the location and orientation module 130 of the computing device 120. The virtual item may be an image of an item that is to be placed in a next assembly step. The virtual item may also be a wireframe model of the physical item in the scene 102 captured by the camera 105. Further, the virtual item may be a CAD model of the physical item or another virtual item.

At 1730, the augmented reality image is generated using the rendering module 140. The rendering module 140 can be configured to render virtual objects in the output image that is provided to the output device 175. The rendering module 140 can perform occlusion between real and virtual objects in the scene 102 captured by the camera 105. The virtual object is rendered in the scene 102 captured by the camera 105 so that it is occluded by real objects in the scene. The virtual object can represent a brick that the user should place to complete the next step. The rendering module 140 is also capable of rendering a virtual object that both occludes and is occluded by objects. The rendering module 140 can be configured to perform different types of occlusion, for example occlusion of a virtual item by a wireframe that is overlaid on top of an assembled model. Another type of occlusion that may be performed by the rendering module 140 is occlusion of the virtual items by a body part (e.g. a hand) that is in the scene 102 captured by the camera 105.

At 1740, the augmented reality image is displayed using an output device 175. The output device 175 can be a display, an augmented reality display, or other suitable output device 175. The output device can include the ability to play sounds to the user, for example audio feedback related to the assembly (e.g. playing a relevant song when the assembly is complete).

The location and orientation of a virtual item in the image is determined 1720, for example by using a computing device 120. The location and orientation of a virtual item can also be based, completely or partially, on a location and orientation marker included in the image (e.g. the marker 230 in FIGS. 2-16). An augmented reality image is generated 1730 by rendering a first virtual item using a first rendering function. The augmented reality image can be generated 1730 by a rendering module 140 that is part of the computing device 120. The augmented reality image is displayed 1740, for example on an output device 175 and the occlusion of the first virtual item by the physical item is shown in the augmented reality image based on the occlusion of the first virtual item by a second virtual item, which is the virtual model of the physical item. The first virtual item can depict the next step in a set of assembly instructions. The rendering functions can include different types of shader. For example, the first rendering function can display a partially transparent wireframe shader, or a shaded shader.

As a non-limiting example, an embodiment of the present disclosure was applied to the assembly instructions for the toy brick set "LEGO Architecture 21036 Arc de Triomphe." In this non-limiting example, the iPhone XS Max, Apple's ARKit 2.0, the Unity game engine, and UnityARKitPlugin were selected. In addition, Apple Watch was used as remote control. C# was used for Unity programming and Objective C for iOS app. Alternative hardware and software configurations are contemplated for use in the system and methods disclosed.

The toy brick set was used to test embodiments of the present disclosure, as shown in FIGS. 2-16. Both more and less complicated assembly instructions sets are contemplated.

Complex models are constructed in sections which can be introduced to the builder in a logical order. Embodiments of the present disclosure include brick renaming with appropriate step numbers in the digital model to build an indexed array of virtual bricks for the construction process, brick by brick. As a non-limiting example, in general, a brick at the lower elevation (with a smaller number in its name) will be constructed before that at the higher elevation (with a larger number in its name). However, in some cases, there are bricks which should be attached to an upper brick instead of a lower brick, when the upper one acts like a bridge and the new brick needs to be attached to its bottom. The order of the bricks in the digital model is different from the instruction booklet, in which sub-models may be made separately and attached to the main model. Computer algorithms can be utilized in the future for construction scheduling and optimization. Alternative build orders, and methods for determining the build order are contemplated.

Images or markers can be set up as AR object anchors, such as the location and orientation markers 230 shown in FIGS. 2-16. Errors of alignment can propagate and increase from locations closer to the AR device camera and the image anchor to locations farther away. Additionally, the image size can contribute to the errors. Smaller image sizes can result in larger errors.

Embodiments of the present disclosure can be controlled remotely (e.g. using a smart watch) for taking screenshots, turning on and off the wireframe model, splitting screen for a headset use, and turning on and off Hand Occlusions. This can be performed by transmitting instructions to the computing device 120. In addition, the interface included in a controller (e.g. the crown of a smart watch) can be used to advance or reverse the construction steps. As a non-limiting example, a continuous clockwise rotation of an angle can be used for the Next Step, and a continuous counterclockwise rotation of an angle can be used for the Previous Step. Different control schemes are contemplated, as well as different ways to interface between the control system and augmented reality system (e.g. AppleWatchKit can be used for the iOS App (BRICKxAR) and Watch App (BRICKxAR Watch App) communication).

The virtual brick of the current step can be rendered in the corresponding place on the model, and also animated in a sub-window on the UI, to help the player recognize the brick better for finding it correctly.

Some embodiments can meet the principles of instruction planning in terms of visibility and occlusions. For example, "Current parts visibility" (CPV), each part in the current subset should be visible with respect to the other parts in the subset. In embodiments of the present disclosure, the current part is a virtual brick. The current brick is either already visible or can be visible by the player rotating the physical model or turning on shaded, nonoccluded shader mode for the brick. Other types of part are contemplated, including both toy and professional construction materials. As another example: "Previous parts visibility" (PPV): Some portion of the parts attached in earlier steps should remain visible for context" can also be performed by embodiments of the present disclosure because parts in earlier steps are the physical bricks and visible naturally.

Similarly, embodiments of the present disclosure perform "Future parts visibility (FPV) (i.e. ensuring that parts added in an earlier assembly step do not occlude parts added in a later assembly step). In some embodiments, the user can rotate the model and control virtual bricks' shader modes, thus the occlusion to the future parts is not a problem.

Creative use of shaders including shaded and wireframe, and occlusive and nonocclusive, helps achieve desired and important virtual-real object occlusion effects. The advantages of the AR-based instruction can include the mixing of already completed physical parts as the context for a new part that is virtual but appears like a physical part in the space. These techniques can be supported in embodiments of the present disclosure, including embodiments that implement the following types of realistic object occlusions:

- Real-Real Occlusion: real bricks occluding each other is the real world physical property.
- Real-Virtual Occlusion: Finished real bricks occluding the current step's virtual brick is made through the real bricks' virtual counterparts, which are aligned accurately and rendered transparently but occluding the current virtual brick if they are in the front in the depth buffering of the camera space.
- Virtual-Real Occlusion: current virtual brick occluding finished real bricks if the current is in the front. The real-virtual and virtual-real occlusions are shown in FIGS. 5 and 6. The same approach can be applied to other objects too, for example, the virtual Flag of France and the physical LEGO set occluding each other partially (FIG. 7).
- Virtual-Virtual Occlusion: for both shaded and wireframe rendering, virtual bricks in front can occlude virtual bricks on the back by default, but any brick can be rendered as nonoccluded.

Thus, using the permutations of real-virtual object occlusions, the user can then have the experience of seeing and perceiving virtual bricks just as real bricks in the real world in terms of object occlusion. This fully natural occlusion can facilitate the users' Three-Dimensional (3D) spatial cognition and their understanding of the spatial relations of the bricks and the instructions of construction steps.

Embodiments of the present disclosure can also implement computer vision-based hand detection, which is implemented for Hand Occlusion and grabbing virtual objects. This can enable "grasping virtual objects with real hands", enhancing hand-eye coordination in embodiments of the present disclosure.

At each step, the current virtual brick can be rendered in either the shaded mode for a more realistic view but occluding the hand and the real brick to be inserted, or the wireframe mode to reveal the hand and the real brick between the wires. While the wireframe rendering of the virtual bricks helps in situations where the density of wires is low, it encounters a problem in situations when the density of wires is high.

Using Computer Vision, the hand can be detected and then virtual objects can be inserted to cover the hand's area and rendered to occlude the virtual bricks (either shaded or wireframe) accurately, while being transparent to reveal the hand. This makes hand-brick occlusion realistic. FIGS. 8 and 9 show the hand-brick occlusion effects before and after the use of Hand Occlusion.

In Computer Vision, the YCbCr color space can be used for effective and/or efficient performance of skin color segmentation. Embodiments of the present disclosure can access the Cb and Cr channels in the video frames captured by the camera (e.g. an iPhone's rear camera) in real time in the AR session. Therefore, the Cb and Cr channels are used in hand color segmentation based on the video frames.

Hand Occlusion Objects (small 2D hexagon shapes or HexSprites in Unity) are instantiated to cover all the detected hand points and the area around each point. They are transformed from the Screen Coordinate System to the World Coordinate System to be located in between the camera clipping plane and the virtual bricks, in order to cover these bricks. The position and rotation of a Hand Occlusion Object are defined in relation to the main camera of the AR scene, as shown in the non-limiting example code below:

HexSprite[i]
  .transform.position=Camera.main.ScreenToWorldPoint
    (new Vector3(screenX, screenY, Camera.main-
    .nearClipPlane+0.01f));
var fwd=Camera.main.transform.forward;
_HexSprite[i]
  .transform.rotation=Quaternion.LookRotation(fwd);

These hexagon-shaped objects can be rendered so that they are transparent in order to show the hands, while occluding the virtual bricks. The Hand Occlusion Objects can be rendered into a different color than the hands in order to visualize the hand detection and occlusion effects. The performance of Hand Occlusion is very good that after turning on hand detection and occlusion, the Frames Per Second (FPS) keeps approximately 28-60 (compared to 50-60 when they are turned off). The visual result can also be accurate with the possible future improvement through, e.g. Deep Learning of hands.

In the embodiments of the present disclosure, the user can directly control the steps using a controller or user interface. Automatic detection of construction process can be also be performed, and embodiments of the present disclosure that include detection of step completion can facilitate the finding of construction errors. Thus a test of automatic detection of step completion has been made through Computer Vision techniques, as demonstrated in FIGS. 12 to 16.

The algorithm to detect the completion of a step can be based on the comparison of the following two differences inside the current virtual brick's bounding box: (1) the difference between the scene images: Image A—without AR content and Image B—with the shaded, current virtual brick, both immediately captured after the previous step is completed (i.e. the start of the current step), and (2) the difference between the scene images: Image C—without AR content, checked every 2 seconds, and Image B; this difference should be small if the step is completed. For each of the two difference images, a standard deviation can be calculated. The two standard deviations are compared and if they are far from each other, meaning a significant change is made inside the current virtual brick's bounding box, there is a high probability that the current step is completed, and the Construction Progress label could be updated to indicate the completion of the step. A non-limiting example of an algorithm is written as follows:

```
for (int n = 0; n < imageDifferenceBeforeBuild.Length; n++)
{
imageDifferenceBeforeBuild[n] =
Math.Abs(clearBeforeBuildGrayscaleValues[n] - grayscaleValues[n]);
}
for (int n = 0; n < imageDifference.Length; n++)
{
imageDifference[n] =
Math.Abs(clearGrayscaleValues[n] - grayscaleValues[n]);
}
double stdDevBeforeBuild = GetStdDev(imageDifferenceBeforeBuild);
double stdDev = GetStdDev(imageDifference);
bool isComplete = (stdDevBeforeBuild - stdDev) > 0.02f;
```

Alternative algorithms to perform this process are also contemplated by the present disclosure.

Embodiments of the present disclosure can allow for a set of toy bricks (such as the LEGO Architecture 21036 Arc de Triomphe set) to be built completely with AR, without the instruction booklet.

Embodiments of the present disclosure comply with instruction guidelines found in literature, e.g. step by step instruction, part and location visibility, etc. Further, some embodiments demonstrate different design principles or effects for AR-based instructions.

Instructions can support and build on a child's existing schemas and mental models, minimize extraneous load but allow for some cognitive drag. In embodiments of the present disclosure, the shaded bricks can match the child's level of graphic literacy naturally because of the realistic shaded rendering, occlusions, and perspective views.

In an instruction booklet, limited angles of view (mostly isometric) may obscure parts. Embodiments of the present disclosure include free and continuous angle changes and the perspective views are consistent with the player's natural graphics literacy, which can eliminate the obscuring problem.

Rotational views may be preferred by some users, such as children, compared to zoom or time-lapse views. Embodiments of the present disclosure can implement rotation (to see what the back of the toy model looks like), zoom (move closer or farther), and back & forward steps can be manipulated freely at any time. Model scale 1:1 (graphic syntax) needs to be used sometimes in the instruction booklets, but some embodiments of the present disclosure can automatically match the virtual model's scale to the physical model.

For instruction booklets, a guideline is to depict the assembly on a work surface or relative to the child's position. In some embodiments of the present disclosure, this can be achieved automatically by the player positioning the assembly (e.g. a LEGO set) on the work surface, and the real and virtual models, forming the instruction, appear relative to the player's position naturally.

Children may have difficulty selecting some components correctly when instruction colors do not accurately reflect the true colors of components. For example, in some LEGO instruction booklets, "orange parts appeared yellow, and black was depicted as a dark grey, presumably to allow edges and features to be shown in black". Embodiments of the present disclosure can include environmental light estimation, and adjust the lighting of the virtual objects to match the physical objects.

Minimal "look times" or "look duration" between gazing at the assembly to gazing at the instructions may be considered important measures for the success of instructions booklets. Embodiments of the present disclosure can overcome this problem, since the user can look at the virtual and real bricks at the same time, thus achieving minimal "look times" and "look duration" straightforwardly.

Both Structural and Action Diagrams can be important for instructions. In embodiments of the present disclosure, the Structural Diagram is made directly by the physical model and the virtual bricks. Further augmenting the Action Diagram by adjusting the graphics with animations for complex models (e.g. LEGO Technic), or other manufacturing tasks is contemplated. With instruction booklets, users must compare two consecutive Structural Diagrams to infer which parts are to be attached, but in embodiments of the present disclosure, some or all the diagrams are consolidated into one single physical model under-construction and a virtual brick to be attached, with the capability to be highlighted to further reduce the cognitive load of understanding the current step. However, if some cognitive drag is desired for the purpose of training, puzzle-like tasks may be added as a game component in BRICKxAR in the future.

Questions and comments about instruction design have been presented, such as "How could the instructions be designed to promote success and learning, particularly among girls?" and "Future studies should be directed at refining the understanding of universal pictorial instruction design to nurture self-efficacy and spatial abilities through appropriately challenging activities". Embodiments of the present disclosure can enable the future integration of serious games and physical construction toys to enhance Learning Through Play. The serious games can be designed to challenge children in terms of spatial reasoning, by using different methods of visualization, suggesting design alternatives, introducing 3D puzzles into the building process, etc. In the future, even for the same model (e.g. a LEGO set), with BRICKxAR, different levels of challenges may adapt to the schemas and mental models of the players of different ages. Young kids may be able to build more complex structures with BRICKxAR, thus are more willing to build and understand complex structures.

It is also contemplated that embodiments of the present disclosure can allow players to use and understand computer models while playing with the physical model. For example, the concepts of modeling can be introduced, such as levels of abstraction, levels of detail, the hierarchical structure of models, simulation of design performance, optimization of construction scheduling, etc. For example, skipping repeated instructions is suggested for the repeated actions in the building of sub-models in instruction booklets. This can require a "reference" to the repeated instruction for multiple sub-models. Currently, BRICKxAR simply provides the repeated instructions step by step, thus the hierarchical structure of the model is "flattened". If the instruction of the structure hierarchy is important for learning the models, additional visualization of sub-models need to be added. It is also contemplated that embodiments of the present disclosure support collaborative construction involving the combination of multiple sub-models made by multiple users in the future.

Different AR glasses or platforms are contemplated, and the techniques may be applied to novel AR glasses and platforms (e.g. a potential mixed reality headset that may run ARKit).

Similarly, embodiments of the present disclosure can be applied in conjunction with other 3D model based construction systems, for example Building Information Modeling systems.

Additional features are contemplated, including sharing instructions between multiple networked users. For example, users may be able to suggest alternative arrangements of assembly steps (e.g. for LEGO 42056 Porsche 911 GT3, users found an alternative build by switching steps 267 and 269 so that the gears can run sequentially).

The use of hand and object occlusion for more complicated models is also contemplated. (e.g. for Technic, the user can grasp the model parts in hand, translate and rotate them in 6-DoF for connecting parts) 3D scanning can be used to understand the model with 6-DoF accurately, which will be needed for AR registration.

A user study of LEGO booklets vs. digital instructions has previously been conducted. A similar user study with AR in the future may further reveal its potential applications in terms of gaming, education, construction, and design. The use of the controller's (e.g. Apple Watch's) sensors to collect physiological data and eye tracking technologies to analyze where the player is looking can facilitate more comprehensive user studies using embodiments of the present disclosure. Comparison studies between Hand Occlusion and grabbing virtual objects in an embodiment of the present disclosure and previous related research and ARKit 3.0's People Occlusion and Magic Leap's Hand Occlusion can be conducted for future development of Hand Occlusion.

Finally, a "brick finder" is contemplated, to help users find the right bricks in the construction process step by step. An experiment was performed with a Deep Learning CNN (Convolutional Neural Network)-based "Brick Finder" utilizing the multi-view renderings of digital bricks as training data. The combined use of embodiments of the present disclosure and the "Brick Finder" can present more opportunities for Learning Through Play.

Additional Examples

In one aspect, the present disclosure relates to a method for performing object occlusion in augmented reality-based step-by-step instructions for assembly. In one aspect, the method includes: capturing an image of a location and orientation marker; determining a location and an orientation of a first virtual item based on the location and orientation of the marker in the image; generating an augmented reality image, wherein the augmented reality image includes a rendering of the first virtual item in the image using a first shader to depict a location and orientation of the first virtual item in the image for guiding a user to place a first physical item or insert it into a physical assembly; changing the rendering of the first virtual item to use a second shader that is transparent or hiding the first virtual item rendered with the first shader and displaying a copy of the first virtual item rendered with the second shader to show the first physical item after it is inserted; updating the augmented reality image by rendering a second virtual item in the image using the first shader to depict a location and orientation of the second virtual item in the image, displaying the augmented reality image, wherein occlusion of the second virtual item by the first physical item is shown, based on the first virtual item or its copy with the second shader; guiding the user to insert a corresponding second physical item into the physical assembly using the second virtual item; repeating the process of changing the rendering of the virtual counterpart (virtual item) of the inserted physical item to use the second shader and rendering the next virtual item using the first shader, displaying the object occlusion, guiding the user to insert the next physical item into the assembly.

In one embodiment, the first shader is a shaded shader or a partially transparent wireframe shader that can be occluded in an augmented reality image.

In one embodiment, the second shader is a transparent and occlusive shader, when applied to a virtual item, can show its physical counterpart (physical item) and occlude a virtual item rendered using the first shader in the augmented reality image.

In one embodiment, the physical item may or may not partially occlude the location and orientation marker.

In one embodiment, the first and second virtual items depict two steps in a sequence of assembly steps.

In one embodiment, upon completion of the current step in the sequence of assembly steps, the second shader is used to render the first virtual item.

In one embodiment, the location and orientation marker includes non-blank areas and blank areas, and the blank areas can be covered by the assembly.

In one embodiment, the first virtual item, second virtual item, first physical item, and second physical item are elements of an assembly or construction, for example: toy bricks, toy blocks, furniture pieces, machine parts, and building components.

In one aspect, the present disclosure relates to a method for performing a visualization of a physical hand grabbing virtual objects in an augmented reality environment. In one embodiment, the method includes: capturing an image of a location and orientation marker; determining a location and an orientation of a virtual item based on the location and orientation of the marker in the image; generating an augmented reality image, wherein the augmented reality image includes a rendering of the virtual item in the image using the first shader to depict a location and orientation of the virtual item in the image; detecting a body part in a region of the image; generating virtual object shapes to fill the region of the body part; rendering the virtual object shapes in the augmented reality image with the second shader, wherein the virtual item is shown to be grabbed, grasped, or held by a physical hand of the user in the augmented reality image based on occlusion of the virtual item by one or more of the virtual object shapes.

In one embodiment, the virtual item's physical counterpart (physical item) is grabbed, grasped, or held by the physical hand.

In one embodiment, the first shader is a shaded shader or a partially transparent wireframe shader that can be occluded in an augmented reality image.

In one embodiment, the second shader is a transparent and occlusive shader, when applied to the virtual object shapes, can show the body part (physical hand) within the area of the shapes and occlude a virtual item rendered with the first shader in the augmented reality image.

In one embodiment, the physical item may or may not partially occlude the location and orientation marker.

In one aspect, the present disclosure relates to a non-transitory computer readable medium including one or more instructions that when executed on a central processing unit (CPU) or a graphics processing unit (GPU) configure the CPU or GPU to perform methods for performing object occlusion.

In one aspect, the present disclosure relates to system including a memory for storing instructions for a computer processor; a recorder operable under control of the computer processor; the computer processor for executing the instructions stored in the memory, certain instructions, which when executed, cause the computer processor to: perform methods of performing object occlusion.

FIG. 18 illustrates an exemplary computer that may comprise all or a portion of a system for performing object occlusion. Conversely, any portion or portions of the computer illustrated in FIG. 18 may comprise all or part of the system for performing object occlusion. As used herein, "computer" may include a plurality of computers. The computers may include one or more hardware components such as, for example, a processor 1821, a random-access memory (RAM) module 1822, a read-only memory (ROM) module 1823, a storage 1824, a database 1825, one or more input/output (I/O) devices 1826, and an interface 1827. Alternatively, and/or additionally, the computer may include one or more software components such as, for example, a computer-readable medium including computer executable instructions for performing a method associated with the exemplary embodiments such as, for example, an algorithm for determining a property profile gradient. It is contemplated that one or more of the hardware components listed above may be implemented using software. For example, storage 1824 may include a software partition associated with one or more other hardware components. It is understood that the components listed above are exemplary only and not intended to be limiting.

Processor 1821 may include one or more processors, each configured to execute instructions and process data to perform one or more functions associated with a computer for controlling a system (e.g., system for performing object occlusion) and/or receiving and/or processing and/or transmitting data associated with electrical sensors. Processor 1821 may be communicatively coupled to RAM 1822, ROM 1823, storage 1824, database 1825, I/O devices 1826, and interface 1827. Processor 1821 may be configured to execute sequences of computer program instructions to perform various processes. The computer program instructions may be loaded into RAM 1822 for execution by processor 1821.

RAM 1822 and ROM 1823 may each include one or more devices for storing information associated with operation of processor 1821. For example, ROM 1823 may include a memory device configured to access and store information associated with the computer, including information for identifying, initializing, and monitoring the operation of one or more components and subsystems. RAM 1822 may include a memory device for storing data associated with one or more operations of processor 1821. For example, ROM 1823 may load instructions into RAM 1822 for execution by processor 1821.

Storage 1824 may include any type of mass storage device configured to store information that processor 1821 may need to perform processes consistent with the disclosed embodiments. For example, storage 1824 may include one or more magnetic and/or optical disk devices, such as hard drives, CD-ROMs, DVD-ROMs, solid state drives, or any other type of mass media device.

Database 1825 may include one or more software and/or hardware components that cooperate to store, organize, sort, filter, and/or arrange data used by the computer and/or processor 1821. For example, database 1825 may store data related to the plurality of thrust coefficients. The database may also contain data and instructions associated with computer-executable instructions for controlling a system (e.g., a multi-material printer) and/or receiving and/or processing and/or transmitting data associated with a network of sensor nodes used to measure water quality. It is contemplated that database 1825 may store additional and/or different information than that listed above.

I/O devices 1826 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1826 may also include a display including a graphical user interface (GUI) for outputting information on a monitor. I/O devices 1826 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1827 may include one or more components configured to transmit and receive data via a communication network, such as the Internet, a local area network, a workstation peer-to-peer network, a direct link network, a wireless network, or any other suitable communication platform. For example, interface 1827 may include one or more modulators, demodulators, multiplexers, demultiplexers, network communication devices, wireless devices, antennas, modems, radios, receivers, transmitters, transceivers, and any other type of device configured to enable data communication via a wired or wireless communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a solid state disk, a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C#, Objective-C, C++ or the like and conventional procedural programming languages, such as the "C" programming language or similar programming languages. The program code may execute entirely on the user's computer or mobile computing device, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for performing object occlusion in augmented reality-based step-by-step instructions for a physical assembly, the method comprising:
capturing an image of a physical item;
determining a location and an orientation of a first virtual item in the image with an augmented reality registration function;
generating an augmented reality image, wherein the augmented reality image comprises a rendering of the first virtual item in the image using only a first rendering function to depict the location and orientation of the first virtual item in the image and a rendering of a second virtual item in the image using only a second rendering function, wherein the first rendering function is a wireframe rendering function for showing the first virtual item and the second rendering function is an occlusive and transparent rendering function, wherein a result of the second rendering function is transparent for showing the physical item and occlusive for hiding the first virtual item;
displaying the augmented reality image, wherein occlusion of the first virtual item by the physical item is shown in the augmented reality image based on occlusion of the first virtual item by the second virtual item, wherein the first virtual item depicts a next step in the step-by-step instructions for the physical assembly;
detecting completion of the next step in the step-by-step instructions for the physical assembly; and
in response to detecting the completion of the next step in the step-by-step instructions for the physical assembly, switching from rendering the first virtual item in the image using only the first rendering function to rendering the first virtual item in the image using only the second rendering function.

2. The method of claim 1, wherein the image further comprises a location and orientation marker, wherein determining the location and orientation of the first virtual item is based on the location and orientation marker in the image.

3. The method of claim 1, wherein the physical item partially occludes the location and orientation marker.

4. The method of claim 1, wherein the location and orientation marker includes a first patterned area, a second patterned area, a first blank area, and a second blank area.

5. The method of claim 1, wherein the first virtual item, second virtual item, and physical item are toy bricks.

6. The method of claim 1, wherein detecting completion of the next step in the step-by-step instructions for the physical assembly comprises detecting completion of the next step in the step-by-step instructions for the physical assembly using computer-vision in the image.

7. A method of performing occlusion and grabbing of a virtual item by a body part in an augmented reality environment, the method comprising:
capturing an image of a physical item grabbed by a body part;
determining an area of the body part in the image based on the image;
determining a location and an orientation of a virtual item with an augmented reality registration function;
generating an augmented reality image, wherein the augmented reality image comprises a rendering of the virtual item in the image using only a first rendering function to depict the location and orientation of the virtual item in the image; and a rendering of the body part using only a second rendering function that occludes the virtual item wherein the body part is represented with a virtual object shape configured to occupy the area of the body part in the image, wherein the first rendering function is a wireframe rendering function for showing the virtual item and the second rendering function is an occlusive and transparent rendering function, wherein a result of the second rendering function is transparent for showing the body part and occlusive for hiding the virtual item;
displaying the augmented reality image, wherein occlusion and grabbing of the virtual item by the body part are shown in the augmented reality image based on occlusion of the virtual item by the virtual object shape, and further wherein the virtual item depicts a next step in step-by-step instructions for a physical assembly;
detecting completion of the next step in the step-by-step instructions for the physical assembly; and
in response to detecting the completion of the next step in the step-by-step instructions for the physical assembly, switching from rendering the virtual item in the image using only the first rendering function to rendering the virtual item in the image using only the second rendering function.

8. The method of claim 7, wherein the body part is a hand.

9. A system, comprising:
a processor; and
a memory coupled to the processor, wherein the memory stores instructions which when executed by the processor cause the system to:
capture an image of a physical item;
determine a location and an orientation of a first virtual item in the image with an augmented reality registration function;
generate an augmented reality image, wherein the augmented reality image comprises a rendering of the first virtual item in the image using only a first rendering function to depict the location and orientation of the first virtual item in the image and a rendering of a second virtual item in the image using only a second rendering function, wherein the first rendering function is a wireframe rendering function for showing the first virtual item and the second rendering function is an occlusive and transparent rendering function, wherein a result of the second rendering function is transparent for showing the physical item and occlusive for hiding the first virtual item;
display the augmented reality image, wherein occlusion of the first virtual item by the physical item is shown in the augmented reality image based on occlusion of the first virtual item by the second virtual item; wherein the first virtual item depicts a next step in a set of step-by-step instructions for a physical assembly;
detect completion of the next step in the step-by-step instructions for the physical assembly; and
in response to detecting the completion of the next step in the step-by-step instructions for the physical assembly, switch from rendering the first virtual item in the image using only the first rendering function to rendering the first virtual item in the image using only the second rendering function.

10. The system of claim 9, wherein the image further comprises a location and orientation marker, wherein determining the location and orientation of the first virtual item is based on the location and orientation of the marker in the image.

11. The system of claim 9, wherein the physical item at most partially occludes the location and orientation marker.

12. The system of claim 9, wherein the location and orientation marker includes a first patterned area, a second patterned area, a first blank area, and a second blank area.

13. The system of claim 9, wherein the first virtual item, second virtual item, and physical item are toy bricks.

14. The system of claim 9, wherein the first virtual item is a CAD model.

15. The system of claim 9, wherein the first virtual item, second virtual item, and physical item are building components.

* * * * *